(12) United States Patent
Leaver et al.

(10) Patent No.: US 8,408,017 B2
(45) Date of Patent: Apr. 2, 2013

(54) REFRIGERATION SYSTEMS HAVING PRESCRIPTIVE REFRIGERANT FLOW CONTROL

(75) Inventors: Daniel C. Leaver, Westmont, IL (US); Gregory M. Billman, Hoffman Estates, IL (US)

(73) Assignee: IMI Cornelius, Inc., Glendale Heights, IL (US)

( * ) Notice: Subject to any disclaimer, the term of this patent is extended or adjusted under 35 U.S.C. 154(b) by 0 days.

(21) Appl. No.: 13/065,045

(22) Filed: Mar. 11, 2011

(65) Prior Publication Data

US 2011/0167840 A1 Jul. 14, 2011

Related U.S. Application Data

(63) Continuation of application No. 11/983,162, filed on Nov. 7, 2007, now abandoned.

(60) Provisional application No. 60/857,625, filed on Nov. 8, 2006.

(51) Int. Cl.
*F25C 1/00* (2006.01)
*A23G 9/00* (2006.01)

(52) U.S. Cl. .................. 62/136; 62/66; 62/135; 62/222; 62/228.2

(58) Field of Classification Search .............. 62/66, 135, 62/136, 222, 228.2
See application file for complete search history.

(56) References Cited

U.S. PATENT DOCUMENTS 4,358,932 A * 11/1982 Helfrich, Jr. .................... 62/126

* cited by examiner

*Primary Examiner* — Cheryl J Tyler
*Assistant Examiner* — Jonathan Bradford
(74) *Attorney, Agent, or Firm* — Niro, Haller & Niro

(57) ABSTRACT

A refrigeration system for a frozen product dispenser is controlled to have a variable cooling capacity that is determined by variable cooling load demands of the dispenser. This is accomplished, in part, by providing the refrigeration system with a variable speed compressor and one or more adjustable expansion valves for metering refrigerant to associated evaporators that are heat exchange coupled to associated freeze barrels of the dispenser, and by controlling the metering setting of the expansion valves and the speed of operation of the compressor in accordance with the cooling load demands of the dispenser. The arrangement provides for efficient operation of the refrigeration system from an energy standpoint and for a reduction in on/off cycling of the system.

7 Claims, 16 Drawing Sheets

| Demand | Maint Load | Low Demand | Med Demand | High Demand | Very High Demand |
|---|---|---|---|---|---|
| Drinks/Min Avg | Less Than 0.2 | 0.2 To 1.25 | 1.25 To 2.5 | 2.5 To 3.33 | 3.33 To 4.0 |
| Act's/Min Avg | Less Than 0.2 | 0.2 To 1.25 | 1.25 To 2.5 | 2.5 To 3.33 | 3.33 To 4.0 |
| Time (sec) Brix Valves "on" In Last 60 Seconds | Less Than 2.5 Seconds | 2.5 To 5.5 Sec | 5.5 To 11.1 Sec | 11.1 To 14.8 Sec | 14.8 To 17.8 Sec |
| Compr RPM | 50% | 55% | 80% | 115% | 150% |
| Btw/Hr Cooling | 6,000 | 6,600 | 10,000 | 14,375 | 18,750 |

| Demand | Maint Load | Low Demand | Med Demand | High Demand | Very High Demand |
|---|---|---|---|---|---|
| Drinks/Min Avg | Less Than 0.2 | 0.2 To 1.25 | 1.25 To 2.5 | 2.5 To 3.33 | 3.33 To 4.0 |
| Act's/Min Avg | Less Than 0.2 | 0.2 To 1.25 | 1.25 To 2.5 | 2.5 To 3.33 | 3.33 To 4.0 |
| Time (sec) Brix Valves "on" In Last 60 Seconds | Less Than 2.5 Seconds | 2.5 To 5.5 Sec | 5.5 To 11.1 Sec | 11.1 To 14.8 Sec | 14.8 To 17.8 Sec |
| Compr RPM | 50% | 55% | 80% | 115% | 150% |
| Btw/Hr Cooling | 6,000 | 6,600 | 10,000 | 14,375 | 18,750 |

FIG. 6

|  | Pull down | Freeze Product | Freeze Product | Maintain |
|---|---|---|---|---|
| Barrel #1 | Yes | Yes | Yes | Part Time |
| Barrel #2 | Yes | Yes | Yes | Part Time |
| Pre-Chiller | No | Yes | Yes | No |
| Comp Speed | 100% | 100 to 150% | 50 to 100% | 50% |
|  |  | >2 drinks/min | <2 drinks/min |  |

FIG. 7

| Demand | Maint Load | Low Demand | Med Demand | High Demand | Very High Demand |
|---|---|---|---|---|---|
| Drinks/Min Avg | Less Than 0.2 | 0.2 To 1.25 | 1.25 To 2.5 | 2.5 To 3.33 | 3.33 To 4.0 |
| Act's/Min Avg | Less Than 0.2 | 0.2 To 1.25 | 1.25 To 2.5 | 2.5 To 3.33 | 3.33 To 4.0 |
| Time (sec) Brix Valves "on" In Last 60 Seconds | Less Than 2.5 Seconds | 2.5 To 5.5 Sec | 5.5 To 11.1 Sec | 11.1 To 14.8 Sec | 14.8 To 17.8 Sec |
| Is Pre-Chiller Enabled | No | Yes | Yes, >2.0 drinks per minute | Yes | Yes |

FIG. 8

| Demand | Maint Load | Low Demand | | | | Med Demand | | High Demand | | Very High Demand | |
|---|---|---|---|---|---|---|---|---|---|---|---|
| Drink Frequency (min) | 0 | 5 | 2 | 1.5 | 0.8 | 0.8 | 0.4 | 0.4 | 0.30 | 0.3 | 0.25 |
| Drinks/min (avg) | 0 | 0.20 | 0.50 | 0.67 | 1.25 | 1.25 | 2.50 | 2.50 | 3.33 | 3.33 | 4.00 |
| Act's/min (avg) | 0 | 0.20 | 0.50 | 0.67 | 1.25 | 1.25 | 2.50 | 2.50 | 3.33 | 3.33 | 4.00 |

| Compressor Schedule | Maint Load | Low Demand | | | | Med Demand | | High Demand | | Very High Demand | |
|---|---|---|---|---|---|---|---|---|---|---|---|
| Compressor RPM | 50% | 50% | 50% | 50% | 55% | 68% | 80% | 90% | 115% | 125% | 150% |
| Btu/hr cooling (est) | 6000 | 6000 | 6000 | 6000 | 6600 | 18,160 | 10,000 | 11,250 | 14,375 | 15,625 | 18,750 |

| CONTROL MODE | COOLING RATE | EXPANSION VALVE POSITION |
|---|---|---|
| PULLDOWN | FIXED COOLING RATE (CR) | FIXED EXPANSION VALVE POSITION MODIFIED BY COOLING RATE AND SYSTEM DIFFERENTIAL PRESSURE |
| MAINTENANCE | FIXED COOLING RATE (CR) | FIXED EXPANSION VALVE POSITION MODIFIED BY COOLING RATE AND SYSTEM DIFFERENTIAL PRESSURE |
| GLIDE | FIXED COOLING RATE (CR) | FIXED EXPANSION VALVE POSITION, BUT GLIDE MODE CR IS A PERCENTAGE OF THE MAINTENANCE MODE CR. |
| DEMAND FOR DRINKS | VARIABLE COOLING RATE (CR) | MODIFIED EXPANSION VALVE POSITION BASED UPON COOLING RATE (UPDATED EVERY SECOND) AND SYSTEM DIFFERENTIAL PRESSURE |

FIG. 17

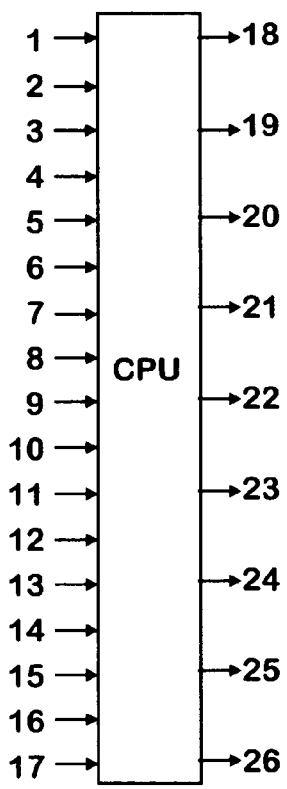

FIG. 19A

| 1 | brix valves, 102, 84 actuation |
|---|---|
| 2 | brix valves 104, 87 actuation |
| 3 | barrel 44 temperature |
| 4 | barrel 44 viscosity |
| 5 | barrel 44 internal pressure |
| 6 | barrel 48 temperature |
| 7 | barrel 48 viscosity |
| 8 | barrel 48 internal temperature |
| 9 | turn on dispenser (pull-down) |
| 10 | compressor suction pressure |
| 11 | compressor discharge pressure |
| 12 | evaporator 42 inlet temperature |
| 13 | evaporator 42 outlet temperature |
| 14 | evaporator 46 inlet temperature |
| 15 | evaporator 46 outlet temperature |
| 16 | evaporator 50 inlet temperature |
| 17 | evaporator 50 outlet temperature |
| 18 | compressor |
| 19 | expansion valve 36 |
| 20 | expansion valve 38 |
| 21 | expansion valve 40 |
| 22 | expansion valve 58 |
| 23 | expansion valve 60 |
| 24 | expansion valve 66 |
| 25 | brix valves 102, 84 |
| 26 | brix valves 104, 87 |

FIG. 19B

REFRIGERATION SYSTEMS HAVING PRESCRIPTIVE REFRIGERANT FLOW CONTROL

This application is a continuation of application Ser. No. 11/983,162, filed Nov. 7, 2007 and now abandoned, which claimed benefit of provisional application Ser. No. 60/857,625, filed Nov. 8, 2006.

FIELD OF THE INVENTION

The present invention relates to refrigeration systems, and in particular to a variable capacity refrigeration system for efficiently handling large variations in cooling load requirements.

BACKGROUND OF THE INVENTION

Depending upon the nature of a load that a refrigeration system is required to service, cooling load requirements imposed on the refrigeration system by the load can vary widely, such for example as when the refrigeration system serves the cooling requirements a frozen beverage product dispenser. In the case of a frozen beverage product dispenser, customer demand for beverages can vary from no drinks dispensed per minute to as many as 3 or 4 or more drinks served per minute. This volatile variation in customer demand results in a very broad range in cooling load requirements for a refrigeration system of a typical frozen product dispenser, for example as is shown by the chart of FIG. 9. As can be seen, depending upon ambient temperature and during periods when no product is being drawn, the maintenance cooling load of a frozen product dispenser can be as low as about 1500 Btu/hr. At the other extreme and during periods of high drink draw rates, for example when delivering drinks at the rate of 4×16 oz drinks per minute, cooling load requirements of a frozen product dispenser may be in excess of 18,000 Btu/hr. This represents about a 12:1 turndown ratio, which from an energy standpoint conventional refrigeration systems are not able to efficiently accommodate.

As is known, refrigeration systems of conventional frozen product dispensers utilize a compressor that delivers refrigerant through a condenser to one or more expansion valves, each of which delivers refrigerant to an associated evaporator coil that is heat transfer coupled to an associated beverage product freeze barrel in order to chill the barrel and at least partially freeze beverage product in the barrel. To accommodate various cooling load requirements of the barrels, the expansion valves are variably controlled to meter refrigerant at various flow rates to the evaporators. As load requirements of an evaporator coil change due to changing customer demands, the expansion valve supplying refrigerant to the evaporator changes to a more appropriate flow metering position. The objective is to adjust the expansion valve so as to match the cooling capability of the evaporator, based upon refrigerant flow to the evaporator, more closely to the dynamically changing cooling load requirements of the barrel being chilled by the evaporator. However, since customer demand for frozen beverage product can vary from no drinks served per minute to as many as 3 or 4 or more drinks served per minute, it is not practical to rely upon a typical control system loop using temperature sensors for feedback. Temperature sensors are too slow to respond to a need for chilling product, since they have a $1^{st}$ order response time on the order of 5 seconds or more, and meanwhile there is a cooling load that is changing faster than the temperature sensors can respond to and the control system cannot keep up with the changing cooling load requirements. In addition, a fixed speed compressor, as is normally used for a frozen product dispenser, is not readily able to accommodate changes in cooling load requirements and is best suited to providing refrigerant flow at a certain constant rate, despite changes that may be occurring in the cooling load that could best be served by varying the flow rate of refrigerant from the compressor. Consequently, refrigeration system balance becomes disturbed as the expansion valves are frequently adjusted in an attempt to meet changing cooling load requirements, resulting in saturated evaporator temperatures dropping as cooling load requirements decrease, rising as cooling load requirements increase, and overall poor control over the temperature of the evaporator. In addition, because the compressor operates at a constant speed, when cooling load requirements decrease, cooling of beverage product in the barrel is quickly satisfied and the compressor must be frequently cycled off/on, resulting in increased stress of compressor components. As a result, where the compressor is not matched with the cooling load, during periods of low product demand the compressor will cycle on/off excessively and the system will operate less efficiently and use more energy than is required.

OBJECTS OF THE INVENTION

An object of the present invention is to provide a prescriptive refrigerant flow control scheme for operating a refrigeration system in a manner such that the refrigeration system efficiently and quickly responds to dynamically changing wide variations in cooling load requirements.

Another object is to provide such a prescriptive refrigerant flow control scheme for operating a refrigeration system having a variable speed compressor, such that the speed of the compressor is controlled in accordance with the cooling load to be satisfied.

A further object is to provide such a prescriptive refrigerant flow control scheme that variably controls the metering position of evaporator expansion valves of the refrigeration system in accordance with the cooling load.

Yet another object is to provide such a prescriptive refrigerant flow control scheme that measures a cooling load to be satisfied and then operates the refrigeration system to provide a total Btu output in accordance with the cooling load.

SUMMARY OF THE INVENTION

In accordance with the present invention, a refrigeration system comprises an evaporator for being heat exchange coupled to a load to be cooled; an expansion valve adjustable to meter refrigerant to the evaporator at various rates; a variable speed compressor controllable to deliver refrigerant to the expansion valve at various rates in accordance with its speed of operation; and means for operating the refrigeration system to adjust the expansion valve to meter refrigerant to the evaporator at a rate, and to control the speed of operation of the compressor to deliver refrigerant to the expansion valve at a rate, determined in accordance with a cooling load requirement of the load.

In a contemplated embodiment of the refrigeration system, the means for operating adjusts the expansion valve and controls the compressor such that the refrigeration system provides a selected cooling output to the evaporator within a selected time period.

The means for operating can comprise means for sensing the cooling requirements of the load; means responsive to the means for sensing for determining the mass flow of refrigerant through the expansion valve necessary for the evaporator to at least closely satisfy the cooling requirements of the load; means for determining the flow rate of refrigerant through the expansion valve in order to meter the determined mass flow of refrigerant through the expansion valve to the evaporator within a selected time; means for adjusting the expansion valve to meter the determined flow rate of refrigerant to the evaporator; and means for operating the compressor at a speed selected to deliver the determined flow rate of refrigerant to the expansion valve.

The load can be a frozen beverage product dispenser having a freeze barrel for being heat transfer coupled to the evaporator. The barrel receives liquid beverage product to be cooled by the evaporator to freeze the beverage product in the barrel, and the means for sensing the cooling requirements of the load comprises means for sensing the volume and temperature of beverage product delivered into the freeze, together with means responsive to the means for sensing for determining the number of Btu's of cooling required to be provided to the barrel to freeze the beverage product in the barrel.

The invention also contemplates a method of operating a refrigeration system, comprising the steps of heat exchange coupling an evaporator to a load to be cooled; flowing refrigerant to the evaporator through an expansion valve that is adjustable to meter refrigerant to the evaporator at various rates; delivering refrigerant to the expansion valve with a compressor having an operating speed that is adjustable to deliver refrigerant to the expansion valve at various rates; and operating the refrigeration system to adjust the expansion valve to meter refrigerant to the evaporator at a rate, and to adjust the speed of operation of the compressor to deliver refrigerant to the expansion valve at a rate, determined in accordance with a cooling load requirement of the load.

The operating step can adjust the expansion valve and the compressor such that the refrigeration system provides a selected cooling output to the load in a selected time period, and may comprise the steps of sensing the cooling requirements of the load; determining, in response to the sensing step, the mass flow of refrigerant through the expansion valve necessary for the evaporator to at least closely satisfy the cooling requirements of the load; determining the flow rate of refrigerant through the expansion valve in order to meter the determined mass flow of refrigerant through the expansion valve to the evaporator within a selected time; adjusting the expansion valve to meter the determined flow rate of refrigerant to the evaporator; and operating the compressor at a speed selected to deliver the determined flow rate of refrigerant to the expansion valve.

In a contemplated practice of the method, the load is a frozen beverage product dispenser having a freeze barrel for being heat transfer coupled to and for being cooled by the evaporator and that receives liquid beverage product to be frozen in the barrel, and the step of sensing the cooling requirements of the load comprises sensing the volume and temperature of beverage product delivered into the barrel: and determining, in response to the sensing step, the number of Btu's of cooling required to freeze the beverage product in the freeze barrel.

BRIEF DESCRIPTION OF THE DRAWINGS

FIGS. 6-8 are control strategy and function tables of contemplated manners of operation of the variable capacity refrigeration system of FIG. 1;

FIG. 17 is a table showing expansion valve metering positions for various modes of operation of an FCB dispenser;

FIGS. 19A and 19B show a microprocessor control for controlling an FCB dispenser in accordance with the prescriptive refrigerant flow control scheme of the invention.

DETAILED DESCRIPTION

Figure 1:
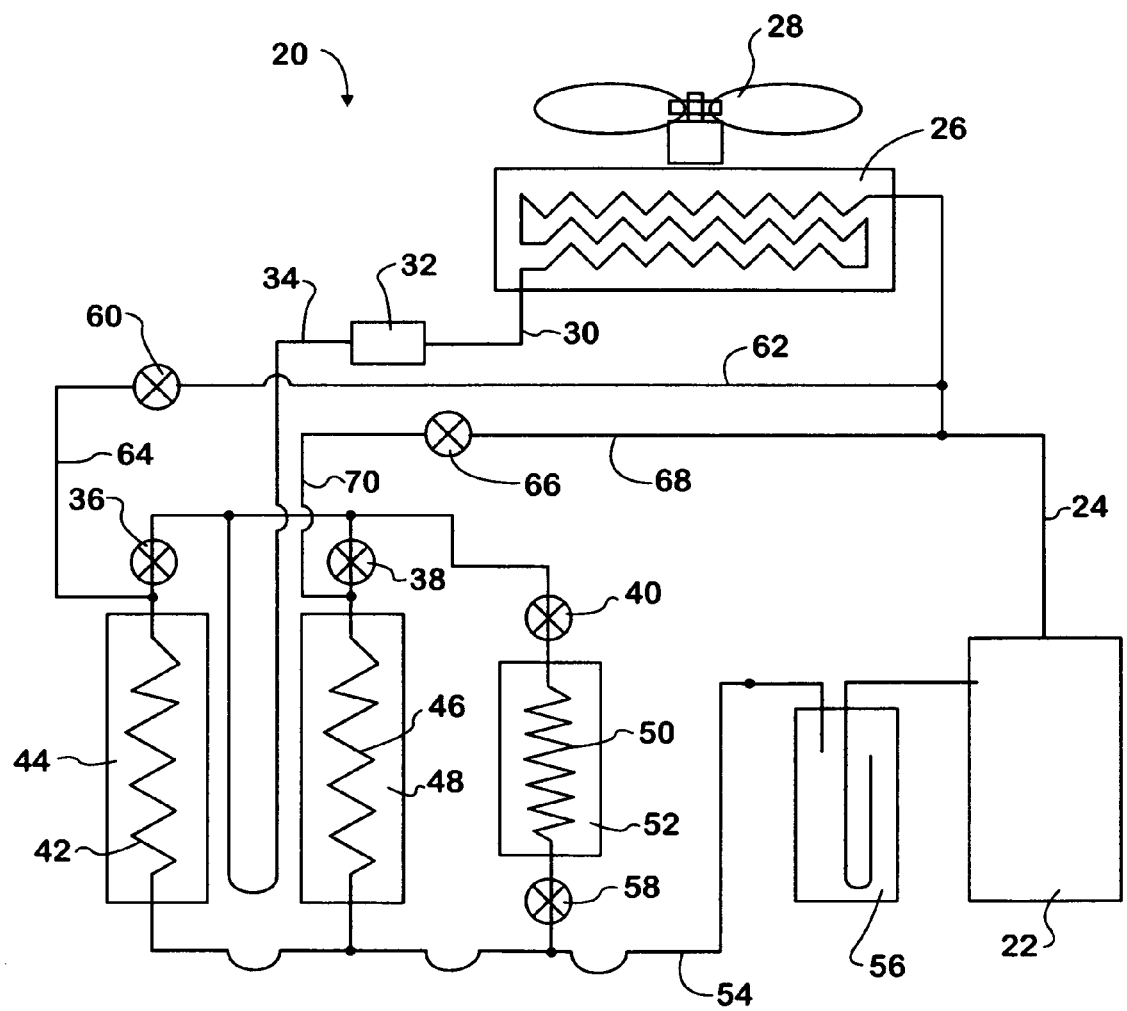
FIG. 1 is a schematic representation of one type of variable capacity refrigeration system that may be operated according to a prescriptive refrigerant flow control scheme of the invention, which is adapted for use in a frozen product dispenser for chilling two product freeze barrels and a product pre-chiller of the dispenser.

The invention provides a novel prescriptive refrigerant flow control scheme for operating a variable capacity refrigeration system, such that the cooling capacity of the refrigeration system is closely matched to a wide range of cooling loads to be satisfied by the system. To efficiently provide various cooling capacities, the refrigeration system utilizes both a variable capacity compressor that is driven at various selected speeds, along with adjustable expansion valves that are controlled to meter refrigerant flows to associated evaporators at various selected rates. The arrangement is such that the compressor is operated at speeds selected, and the expansion valves are operated to meter refrigerant at flows selected, to provide refrigerant flows to the evaporators such that the refrigeration system provides a cooling output, over a selected cycle time, that closely a matches cooling load to be satisfied. While a refrigeration system operated according to the prescriptive refrigerant flow control scheme may advantageously be used in various diverse applications where dynamically changing cooling load requirements are encountered, a presently contemplated use for such a refrigeration system is in providing cooling for a frozen product dispenser, such as a frozen carbonated beverage (FCB) dispenser, and the invention will therefore be described in that environment.

It is desirable that a refrigeration system for an FCB dispenser be able to handle a broad range of cooling loads imposed upon it, in order that the dispenser might maintain good control over frozen beverage product temperature and viscosity. Unlike conventional refrigeration systems for FCB dispensers, which use a fixed speed compressor that is sized for a maximum load situation, in practice of the invention the refrigeration system has both a variable speed compressor and adjustable evaporator expansion valves that are controlled to meter refrigerant to associated evaporators in accordance with refrigerant flows provided by the compressor. The arrangement enables the refrigeration system, when operated according to the prescriptive refrigerant flow control scheme of the invention, to have its cooling capacity closely matched to the cooling load requirement of the FCB dispenser at any point in real time. In general, the pumping rate of the compressor and the refrigerant flows through the evaporator expansion valves are decreased when cooling loads decrease and increased when cooling loads increase, in a manner to maintain high refrigeration system efficiency. It is contemplated that the variable speed compressor have, preferably but not necessarily, a speed range of at least 3:1, for example about 50% nominal speed at minimum cooling capacity to as much as 150% nominal speed at maximum cooling capacity, which provides the ability to closely and efficiently match compressor cooling capacity to dispenser cooling load requirements over a fairly broad range. As a result, the need for the compressor to cycle off/on is significantly reduced, which significantly reduces the frequency of startup stresses on the compressor.

Some of the benefits achieved in use of the prescriptive refrigerant flow control scheme of the invention include improvements in refrigeration cycle and energy efficiency because of a better matching of compressor pumping rate and evaporator expansion valve refrigerant flow rates to dispenser cooling load requirements; improvements in the reliability of the compressor because of reduced on/off cycling; improvements in the consistency of the temperature and viscosity of finished frozen beverage product because of better control over cooling capacity; a reduction in the noise levels of the refrigeration system, since the compressor will often run at lower speeds; and a further decrease in operating noise as a result of a reduction in condenser fan speed as compressor speed is reduced.

Referring to the drawings, a refrigeration system that may be operated according to the prescriptive refrigerant control scheme of the invention is shown in FIG. 1 and indicated generally at 20. The refrigeration system includes a variable speed/capacity compressor 22, which may be a scroll or a reciprocating compressor that has a variable-frequency drive for applying to an ac motor of the compressor an ac voltage signal that has a frequency selected to provide a desired speed of operation of the motor and, thereby, a desired refrigerant flow rate from and output capacity of the compressor. Hot refrigerant at an outlet from the compressor is coupled through a refrigerant line 24 to an inlet to a condenser 26, through which air is drawn by a fan 28 to cool the refrigerant. Cooled refrigerant at an outlet from the condenser flows through a refrigerant line 30 to and through a filter/dryer 32 and a refrigerant line 34 to inlets to each of three electronically controlled adjustable expansion valves 36, 38 and 40 that may be of the stepper motor driven or pulse valve modulated type, such that the valves may be controlled to meter selected refrigerant flows from their outlets. Refrigerant exiting an outlet from the expansion valve 36 is delivered to an inlet to an evaporator coil 42 that is heat transfer coupled to a first beverage product freeze barrel 44 of an FCB dispenser to chill the barrel and freeze beverage product in the barrel. Refrigerant exiting an outlet from the expansion valve 38 is delivered to an inlet to an evaporator coil 46 that is heat transfer coupled to a second beverage product freeze barrel 48 of the dispenser to chill the barrel and freeze beverage product in the barrel. Refrigerant exiting an outlet from the expansion valve 40 is delivered to an inlet to an evaporator coil 50 that is heat transfer coupled to a pre-chiller 52 of the dispenser to chill the pre-cooler and, thereby, to chill beverage product flowed through the pre-chiller before being introduced into the barrels 44 and 48. After passing through each of the barrel evaporators 42 and 46, refrigerant exiting outlets from the evaporators flows through a refrigerant line 54 and an accumulator 56 to an inlet to the compressor 22. After passing through the pre-cooler evaporator 50, refrigerant exiting the evaporator flows through an evaporator pressure regulating valve 58 and then through the refrigerant line 54 and accumulator 56 to the inlet to the compressor. The evaporator pressure regulating valve 58 serves to prevent the pressure of refrigerant in the evaporator 50 from falling below a lower limit, thereby to prevent freezing of beverage product in the pre-chiller 52.

The refrigeration system 20 has two defrost circuits, a first one of which includes a solenoid operated refrigerant valve 60 having an inlet coupled to hot refrigerant at the outlet from the compressor 22 through a refrigerant line 62 and an outlet coupled to the inlet to the freeze barrel evaporator 42 through a refrigerant line 64. A second defrost circuit includes a solenoid operated refrigerant valve 66 having an inlet coupled to hot refrigerant at the outlet from the compressor 22 through a refrigerant line 68 and an outlet coupled to the inlet to the freeze barrel evaporator 46 through a refrigerant line 70. The defrost circuits are operated to heat the evaporators 42 and 46 to defrost the beverage product barrels 44 and 48 in defrost cycles of the refrigeration system.

Figure 2:
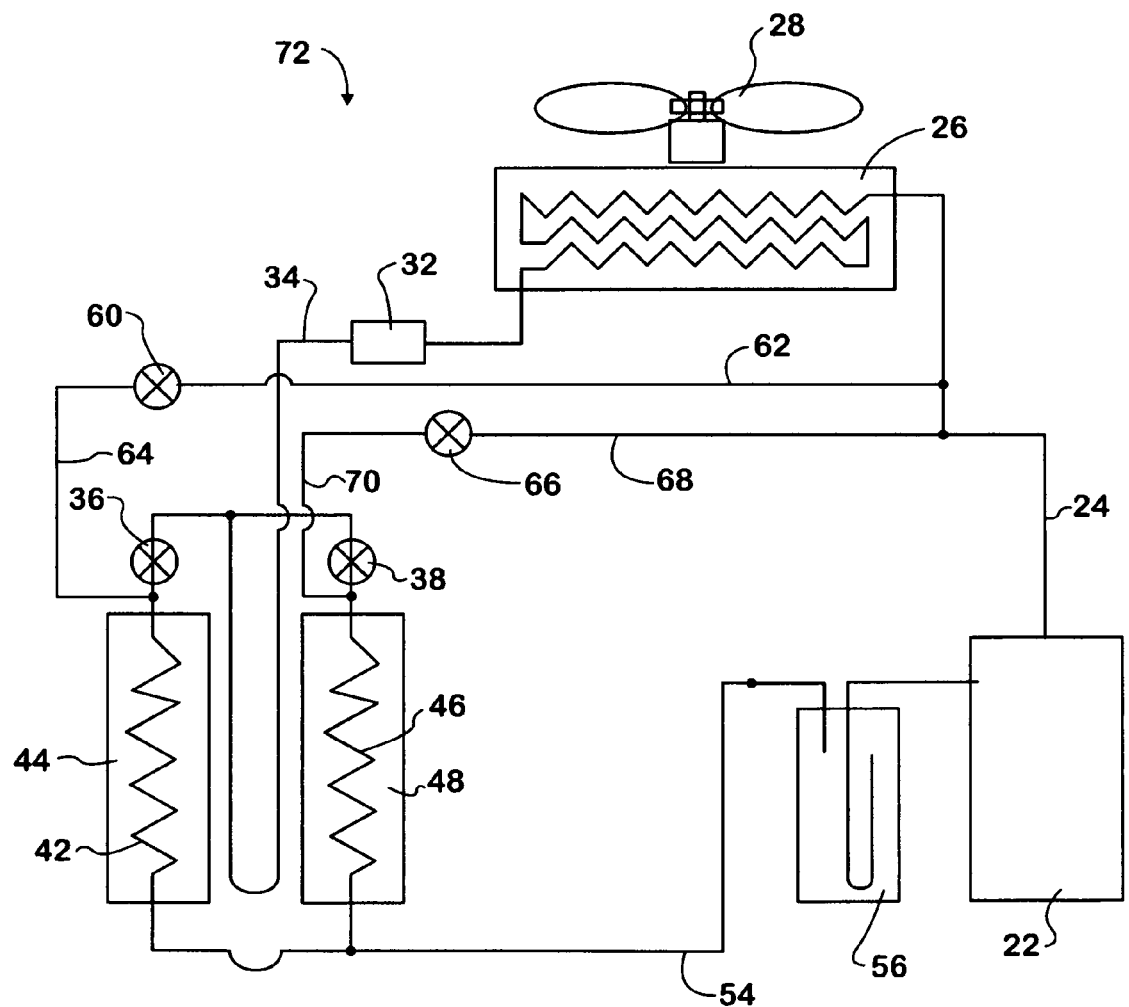
FIG. 2 is similar to the system of FIG. 1, except that the refrigeration system does not include a pre-chiller.

The refrigeration system 20 is adapted for use with an FCB dispenser that has a pre-chiller 52. To provide chilling for FCB dispensers that does not have a pre-chiller, a refrigeration system of a type shown in FIG. 2 and indicated generally at 72 may be used. The refrigeration system 72 is similar to the refrigeration system 20, and like reference numerals have been used to denote like components. A difference between the two systems is that since the system 72 does not provide for cooling of a pre-chiller 52, it does not have an evaporator coil 50, an electronically controlled expansion valve 40 and an evaporator pressure regulating valve 58. Otherwise, the structure and operation of the two refrigeration systems 20 and 72 is generally similar.

Figure 3:
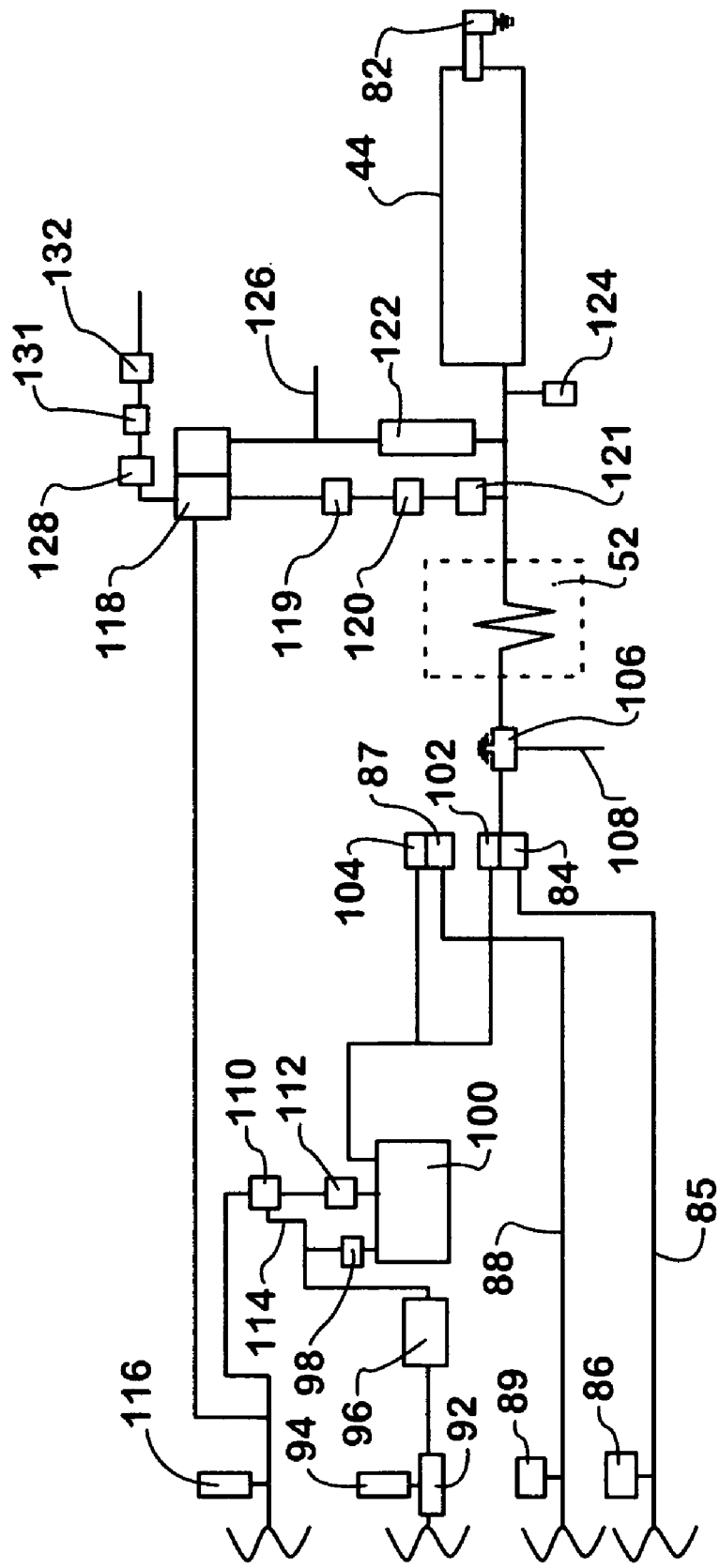
FIG. 3 is a schematic representation of one type of frozen beverage product dispensing system utilizing ambient temperature carbonation, of a type with which a variable capacity refrigeration system may be used.

Since operation of a refrigeration system according to the prescriptive refrigerant control scheme of the invention, to provide cooling for an FCB dispenser having a pre-chiller, generally embodies operation of a refrigeration system to provide cooling for an FCB dispenser that does not have a pre-chiller, the invention will be described in terms of the refrigeration system 20 being used with an FCB dispenser having a pre-chiller. One such FCB dispenser is shown in FIG. 3 and indicated generally at 80, and includes the two beverage product freeze barrels 44 and 48, only the barrel 44 being shown. The dispenser utilizes ambient temperature carbonation, and while not specifically shown in FIG. 3 (but shown in FIG. 1), it is understood that the evaporator coil 42 is heat transfer coupled to the barrel 44 to chill the barrel in order to freeze a beverage product mixture delivered into the barrel. With reference to the portion of the dispenser 80 shown and associated with the freeze barrel 44, it being understood that a like description would apply to a similar but less than fully shown portion of the dispenser associated with the freeze barrel 48, a frozen beverage product dispensing valve 82 is coupled to the barrel 44 for service of frozen beverages. To deliver liquid beverage components to the barrel 44 for being frozen, an externally pumped beverage syrup concentrate is delivered to an inlet to a syrup brixing valve 84 through a syrup line 85, to which line is coupled a sensor 86 for detecting a syrup-out condition. To deliver liquid beverage components to the barrel 48 (shown in FIG. 1), an externally pumped beverage syrup concentrate is delivered to an inlet to a syrup brixing valve 87 through a syrup line 88, to which line is coupled a sensor 89 for detecting a syrup-out condition. A potable water supply, such as from a city main, is connected to the dispenser through a strainer/pressure regulator 92 to which is coupled a pressure switch 94 for detecting a water-out condition, and from the strainer/pressure regulator the water passes through a carbonator pump 96 and a check valve 98 to a water inlet to a carbonator 100. The carbonator 100 operates in a manner well understood in the art to carbonate water, and carbonated water at an outlet from the carbonator is delivered to an inlet to a water brixing valve 102 associated with the syrup brixing valve 84, and to an inlet to a water brixing valve 104 associated with the syrup brixing valve 87. The brixing valves 104, 87 comprise an associated pair of brixing valves that deliver a water and syrup mixture, in a selected ratio, through a fluid circuit (not shown) that includes the pre-chiller 52, to the freeze barrel 48. The brixing valves 102, 84 comprise an associated pair of brixing valves that deliver a water and syrup mixture, in a selected ratio, through an associated fluid circuit that includes the pre-chiller 52, to and into the freeze barrel 44. The water/syrup beverage mixture provided at an outlet from each pair of brixing valves is in a ratio determined by the settings of the individual valves of each pair. The water and syrup mixture delivered from the pair of brixing valves 102, 84 is delivered through a 3-way valve 106 and the pre-chiller 52 to the freeze cylinder or barrel 44, it being understood that, although not shown (but shown in FIG. 1), the evaporator coil 50 is heat exchange coupled to the pre-chiller. The 3-way valve 106 has an outlet 108 leading to atmosphere, by means of which a sample of the water and syrup mixture output by the pair of brixing valves 102 and 84 may be collected for analysis, so that any necessary adjustments may be made to the brixing valves to provide a desired water/syrup ratio.

To carbonate water in the carbonator tank 100, an externally regulated supply of $CO_2$ is coupled through a temperature compensated pressure regulator 110 and a check valve 112 to the carbonator, the regulator 110 including a capillary sensor 114 for detecting the temperature of incoming water. A sensor 116 detects a $CO_2$-out condition, and the supply of $CO_2$ is also coupled to inlets to each of two $CO_2$ pressure regulators of a manifold 118. An outlet from a first one of the manifold pressure regulators is coupled through a solenoid shut-off valve 119, a $CO_2$ flow control valve 120 and a $CO_2$ check valve 121 to the water and syrup mixture line extending between the pre-chiller 52 and an inlet to the freeze barrel 44. In addition, $CO_2$ at an outlet from the second one of the manifold pressure regulators is coupled to an upper opening to an expansion tank 122, a lower opening to which is coupled to the water and syrup mixture line between the pre-chiller and freeze barrel. The flow control valve 120 accommodates adjustment of the carbonation level in the barrel 44 by enabling the introduction of $CO_2$ into the barrel for a brief period of time before a mixture of water and syrup is delivered into the barrel. A pressure transducer 124 monitors the pressure of the water and syrup mixture delivered to and into the barrel 44 and serves as a pressure cut-in/cut-out sensor to control filling and refilling of the barrel with beverage product to be frozen. As is understood by those skilled in the art, when the pressure transducer 124 detects a lower limit cut-in pressure in the barrel, for example 23 psi, the pair of brixing valves 102, 84 is opened for flow of a water and syrup mixture to and into the barrel to refill the barrel, until the pressure transducer detects an upper limit cut-out pressure, for example 29 psi, whereupon the pair of brixing valves is closed. During flow of the water and syrup mixture to the barrel, the mixture is cooled as it flows through an associated circuit in the pre-chiller 52. During freezing of the mixed beverage product in the freeze barrel 44, the mixture expands and the expansion chamber 122 provides a volume for a portion of the expanding mixture to move into.

As mentioned, the dispenser 80 includes the freeze barrel 48 and, therefore, includes further structure (not shown) that is generally duplicative of that to the right of the pair of brixing valves 102, 84 and that accommodates delivery of a water and syrup mixture from the pair of brixing valves 104, 87 to the barrel 48, except that the beverage mixture does not flow through a separate pre-chiller, but instead flows through an associated circuit of the pre-chiller 52. In addition, a line 126 delivers $CO_2$ to an upper opening to an expansion chamber (not shown), a lower opening from which is coupled to an inlet to the barrel 48, and to accommodate addition of $CO_2$ to the barrel 48, the outlet from the manifold first $CO_2$ pressure regulator is also coupled through a solenoid shut-off valve 128, a $CO_2$ flow control valve 130 and a $CO_2$ check valve 132 to the inlet to the barrel.

Figure 4:
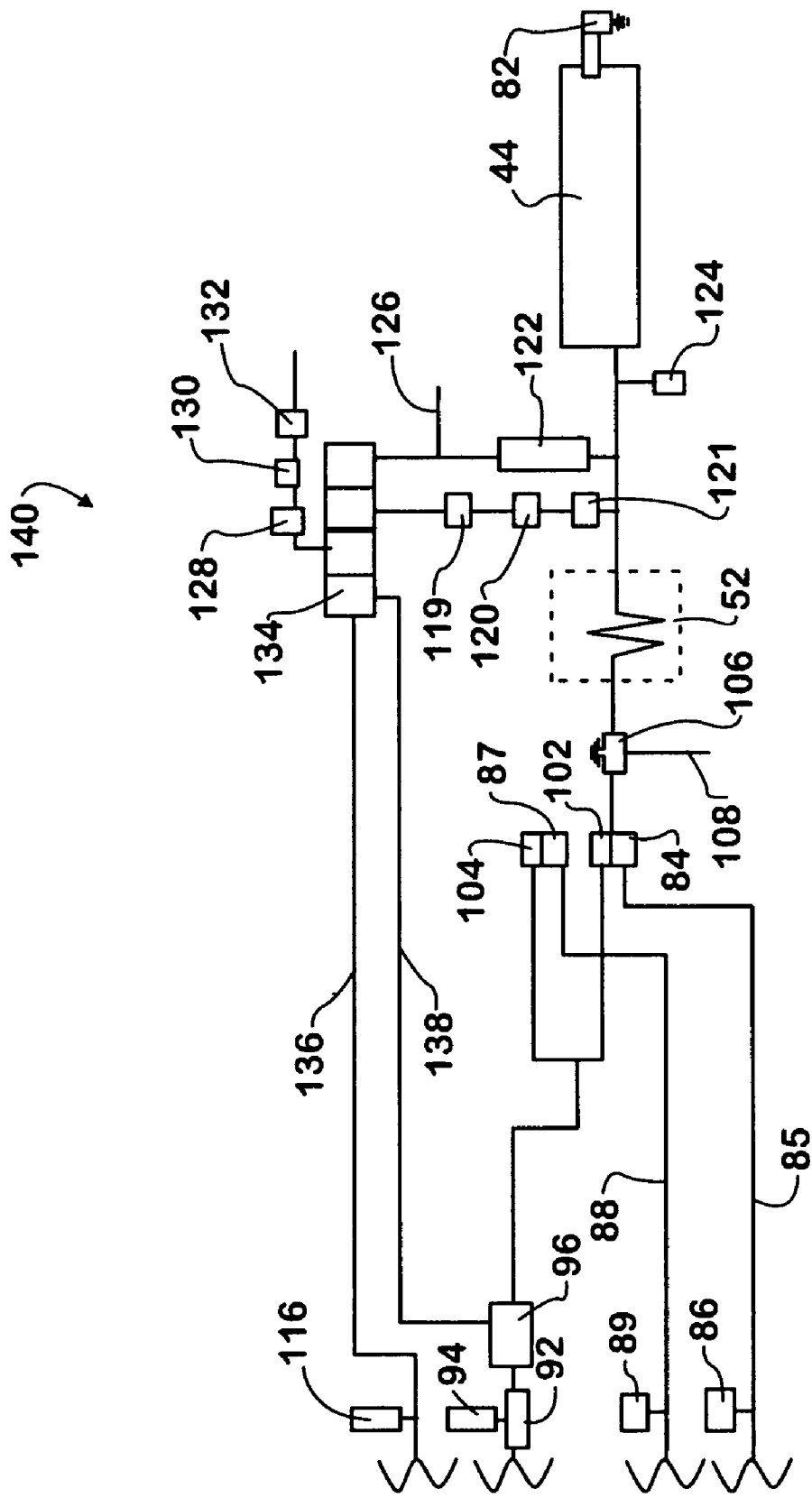
FIG. 4 is a schematic representation of another type of frozen beverage product dispensing system utilizing chilled carbonation, of another type with which a variable capacity refrigeration system may be used.

Another type of FCB dispenser with which the refrigeration system 20 may be used and operated according to the prescriptive refrigerant flow control scheme of the invention, is shown in FIG. 4 and indicated generally at 140. The dispenser 140 is somewhat similar to the FCB dispenser 80 of FIG. 3, except that it utilizes chilled carbonation, and like reference numerals have therefore been used to denote like components. With reference to the portion of the dispenser 140 associated with the freeze barrel 44, it being understood that a similar description applies to a similar but only partially shown structure of the dispenser associated with the freeze barrel 48, to deliver liquid beverage components to the barrel 44 for being frozen, an externally pumped beverage syrup concentrate is delivered to the syrup brixing valve 84 through the syrup line 85, to which is coupled the sensor 86 for detecting a syrup-out condition. To deliver beverage components to the barrel 48, an externally pumped beverage syrup concentrate is delivered to the inlet to the syrup brixing valve 87 through the syrup line 88, to which is coupled the sensor 89 for detecting a syrup-out condition. A potable water supply is connected to the dispenser through a strainer/pressure regulator 92, to which is coupled a pressure switch 94 for detecting a water-out condition. The outlet from the strainer/pressure regulator 92 is coupled to an inlet to a $CO_2$ driven water pump 96, and unlike the dispenser 80 of FIG. 3, in which the outlet from the water pump is delivered to an inlet to an ambient temperature carbonator 100, in the FCB dispenser 140, an outlet from the water pump 96 is fluid coupled directly to the inlet to each of the water brixing valves 102 and 104. The brixing valves 104, 87 deliver a water/syrup mixture in a selected ratio through an associated fluid circuit (not shown) that includes the pre-chiller 52 to the freeze barrel 48, and the brixing valves 102, 84 deliver a water/syrup mixture in a selected ratio through the 3-way valve 106 and the pre-chiller 52 to an inlet to the freeze barrel 44. The outlet 108 from the valve 106 provides a means by which a sample of the water/syrup mixture flowed from the brixing valves 102, 84 may be collected for analysis, such as by means of a hygrometer reading, so that any necessary adjustments may be made to the brixing valves to provide the desired water/syrup ratio.

An externally regulated $CO_2$ supply is coupled through a line 136 to inlets to each of four $CO_2$ pressure regulators of a manifold 134, to which line is coupled the sensor 116 for detecting a $CO_2$-out condition. An outlet from a first one of the manifold pressure regulators is coupled through a line 138 to the $CO_2$ driven water pump 96 to operate the pump. An outlet from a second one of the manifold $CO_2$ pressure regulators is coupled through the solenoid shut-off valve 119, the $CO_2$ flow control valve 120 and the $CO_2$ check valve 121 to the chilled water/syrup mixture flowing from the pre-chiller 52 to the inlet to the freeze barrel 44, thereby to selectively carbonate the chilled beverage mixture in accordance with the solenoid shut-off valve 119 being open or closed and the setting of the flow control valve 120, whereby either carbonated or non-carbonated beverages may selectively be frozen in the barrel 44. An outlet from a third one of the manifold $CO_2$ pressure regulators is coupled to the upper opening to the expansion tank 122, the lower opening to which is coupled to the water/syrup mixture line extending between the outlet from the pre-chiller 52 and inlet to the freeze barrel 44. When frozen carbonated beverages are served, the flow control valve 120 accommodates adjustment of the carbonation level in the barrel 44. The pressure transducer 124 monitors the pressure of the beverage mixture introduced into and within the barrel and serves as a cut-in/cut-out pressure sensor control refilling of the barrel. When beverage product is frozen in the barrel it expands and the expansion tank 122 accommodates such expansion by receiving some of the beverage product.

Since the dispenser 140 includes the freeze barrel 48, it also includes further structure (not shown) that is generally duplicative of the structure shown to the right of the brix valves 102, 84, to accommodate delivery of a water and syrup mixture from the brix valves 104, 87 to the barrel 48, except that the beverage mixture does not flow through a separate pre-chiller, but instead flows through an associated beverage circuit of the pre-chiller 52. In addition, the line 126 at the outlet from the manifold third $CO_2$ pressure regulator delivers $CO_2$ to an upper opening to an expansion chamber (not shown), a lower opening from which is coupled to the inlet to the barrel 48, and to accommodate carbonating the beverage mixture delivered to the barrel 48, an outlet from a second $CO_2$ pressure regulator of the manifold 118 is coupled through the solenoid shut-off valve 128, the $CO_2$ flow control valve 130 and the $CO_2$ check valve 132 to the chilled beverage mixture intermediate the pre-chiller 52 and the inlet to the barrel 48.

Figure 5:
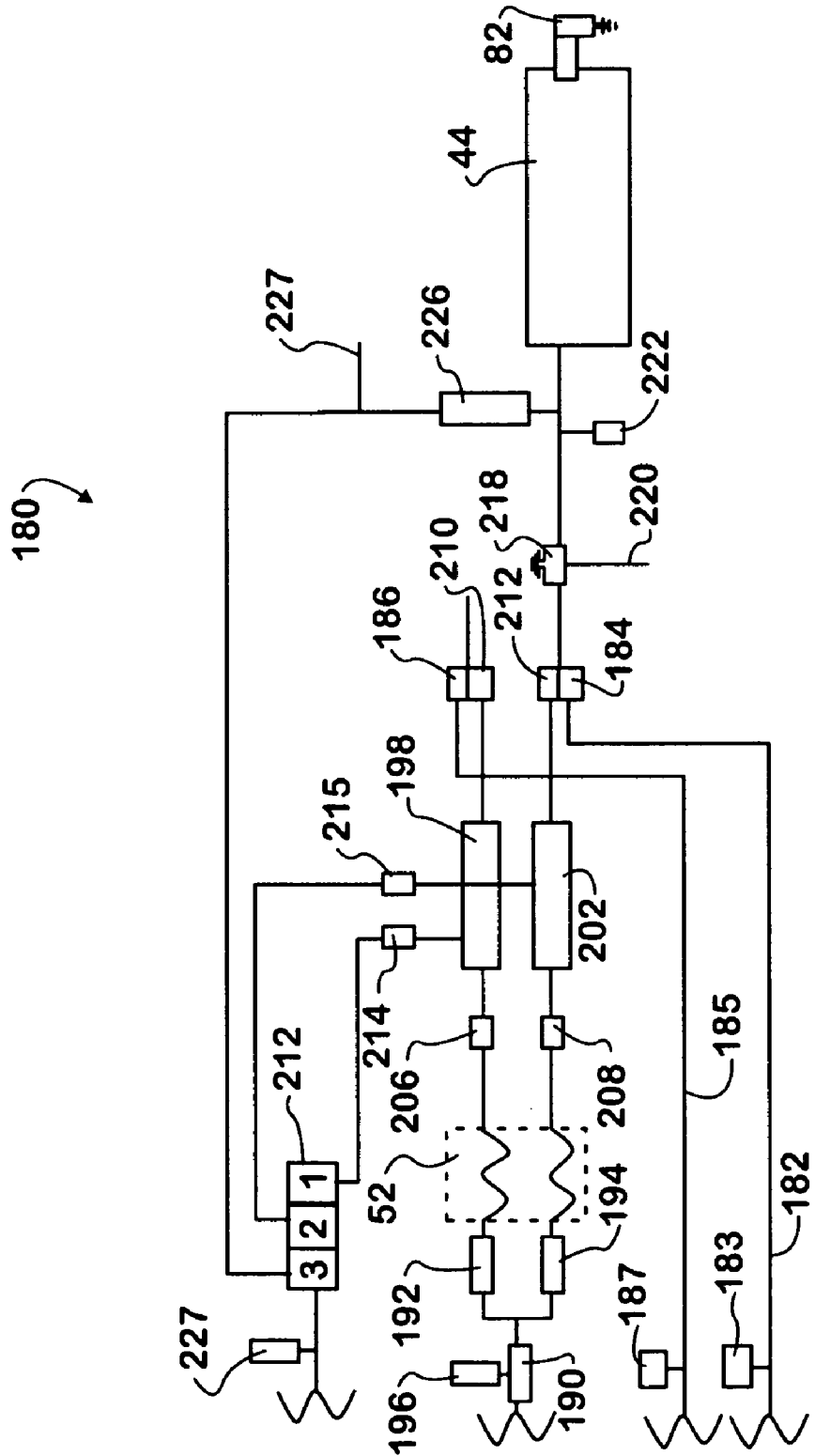
FIG. 5 is a schematic representation of a further type of frozen beverage product dispensing system utilizing an in-line chilled carbonation system, of a further type with which a variable capacity refrigeration system may be used.

A further type of FCB dispenser with which the refrigeration system 20 may be used and operated according to the prescriptive refrigerant flow control scheme of the invention, and that utilizes in-line cold carbonation, is illustrated in FIG. 5 and indicated generally at 180. As for the previously described embodiments, it is understood that only somewhat more than one-half of the dispenser is illustrated and that an additional portion that would include the freeze barrel 48 is not shown, but is part of the dispenser. To deliver a first flavor of syrup to the dispenser, an externally pumped first syrup supply is coupled through a line 182 to an inlet to syrup brix valves 184, with a switch 183 detecting exhaustion of the first syrup supply. To deliver a second flavor of syrup to the dispenser, an externally pumped second syrup supply is coupled through a line 185 to an inlet to a syrup brix valve 186, with a switch 187 detecting exhaustion of the syrup supply. To deliver water to the dispenser, potable water from a city water main is coupled through a strainer/regulator 190 to inlets to each of two water pumps 192 and 194, and a pressure switch 196 is coupled to the strainer/regulator to detect a water-out condition. Water at outlets from the pumps 192 and 194 is delivered through associated fluid circuits in the pre-chiller 52 for being cooled, with water from the pump 192 then being delivered through a check valve 206 to a water refill inlet to a carbonator tank 198, and then from an outlet from the carbonator tank to an inlet to a water brix valve 210 associated with the syrup brix valve 186. In turn, water from the pump 194 is delivered through a check valve 208 to a water refill inlet to a carbonator tank 202, and then from an outlet from the carbonator tank to an inlet to a water brix valve 212 associated with the syrup brix valve 184. To carbonate water in the carbonators 198 and 202, an external supply of $CO_2$ is coupled to inlets to three pressure regulators of a manifold 212, and an outlet from a first pressure regulator of the manifold is coupled through a solenoid controlled valve 214 to a $CO_2$ inlet to the carbonator 198 and an outlet from a second pressure regulator of the manifold is coupled through a solenoid controlled valve 215 to a $CO_2$ inlet to the carbonator 202, with a sensor 216 being provided to detect a $CO_2$ out condition. When carbonation of water in the carbonator tanks 198 and 202 is desired for service of carbonated frozen beverages, the solenoid controlled valves 214 and 215 are operated to their open states. When water in the carbonator tanks is not to be carbonated, the valve 214 and 215 are operated to their closed state. An output from a third pressure regulator of the manifold 212 is applied to an upper inlet to an expansion chamber 226 as well as through a line 227 to an upper inlet to an expansion chamber associated with the freeze barrel 48 (neither shown).

Each pair of water/syrup brixing valves 210, 186 and 212, 184 is adjustable to provide a selected water/syrup ratio to its associated freeze barrel 48 and 44. In this connection, a common outlet from the valves 212, 184 is coupled through a 3-way valve 218 to an inlet to the freeze barrel 44. The 3-way valve has an outlet 220 leading to ambient, whereby a water and syrup beverage mixture supplied by the brixing valves 212, 184 may be collected for analysis. A pressure transducer 299 senses the pressure of the beverage mixture delivered to and within the product freeze barrel 44 and operates as a cut-in/cut-out sensor in a manner as described in connection with the FCB dispensers of FIGS. 3 and 4.

The FCB dispenser 180 includes the freeze barrel 48 (not shown). A common outlet from the brixing valves 210, 186 is delivered through an associated 3-way valve (also not shown) to an inlet to the barrel 48, and a pressure transducer and an expansion tank are coupled to the inlet to the barrel (neither shown). Operation of the dispenser 180 in providing frozen beverage product from the freeze barrels 44 and 48 is understood by those skilled in the art in view of the above-described operation of the dispensers 80 and 140.

As discussed, the load requirements of an FCB machine are highly variable, since customer demand for frozen beverage product dispensed can vary from no drinks being served to as many as 3 or 4 or more drinks served per minute. Because the demand for Btu cooling output by the refrigeration system is so variable and rapidly dynamically changing, it is not practical to rely upon a typical control loop using temperature sensors for feedback to control operation of the refrigeration system. Temperature sensors are too slow, having a $1^{st}$ order response time on the order of 5 seconds or more, and cannot provide meaningful outputs in a sufficiently timely manner to enable the refrigeration system to keep up with changes in cooling load demand. While temperature sensors would be responding to changes in temperature, such as occur in a freeze barrel during refill of the barrel, changes in the cooling load that the refrigeration system is required to meet can be occurring at a rate faster than the temperature sensors can respond to, and the refrigeration system control cannot keep up.

Ideally, as cooling loads imposed on the refrigeration system 20 by an FCB machine rapidly change due to volatile customer demand for frozen beverages, the speed of operation of the refrigeration system compressor and the metering positions of the expansion valves immediately follow the cooling load and adjust to more appropriate settings. The idea is to closely match the cooling capacity of the refrigeration system to the immediate and dynamically changing cooling load requirements.

For each frozen beverage drawn from a freeze barrel, there is a "batch" of cooling that must be provided by the refrigeration system to the FCB dispenser. The batch of cooling can be expressed in terms of the number of Btu's of cooling that must be provided by the refrigeration system to the dispenser (i.e., Btu's of heat that must be extracted by the refrigeration system from the dispenser) to chill and properly freeze the relatively warm beverage product that is flowed through the dispenser to the freeze barrel to refill the barrel, which number of Btu's is dependent upon the volume and ambient temperature of the beverage product flowed through the dispenser. As multiple frozen beverages are drawn, the batches of cooling Btu's required to be provided by the refrigeration system increase. Since the flow rate of liquid beverage product through a pair of brixing valves can be closely approximated and the temperature of beverage product flowed into the FCB dispenser can be sensed, the batches of Btu's required to chill and freeze the beverage product can be closely correlated with the time duration of actuation, or on time, of the brixing valves that deliver the beverage product mixture to a freeze barrel, together with the temperature of the beverage product. Thus, given the on time of the brixing valves and the temperature of the beverage product flowed into the dispenser, the Btu's of cooling required for a batch of beverage product passing through the dispenser can readily be determined.

Depending upon the number of drinks drawn, the total number of Btu's required to satisfy the cooling load will vary and generally equal the sum of the batches of Btu's as measured by the control system in terms of total brix valve on time and ambient temperature of liquid beverage components delivered to the FCB machine. Because there is variation in these parameters over time, a 30-second rolling average can be used to smooth the information, such that the control system that utilizes the prescriptive refrigerant flow control responds primarily to the most recent information. For any average value of brixing valve on time, a volume flow of refrigerant required to satisfy the cooling load can be calculated, based upon which the refrigeration system compressor is operated at a selected speed, and the expansion valves are operated to selected metering positions, such that the required refrigerant volume flow occurs in a selected cycle time.

In general, as warm beverage product flows into the FCB dispenser with opening of brix valves, the number of Btu's required to chill and freeze the product is calculated and introduced into a $Btu_{total}$ counter of the prescriptive control system. If there is a Btu count already stored in the counter, the latest count is added to it. When there is a count in the $Btu_{total}$ counter representing an amount of cooling that must be provided by the refrigeration system for the dispenser to freeze product in the barrels, a determination is made of the mass flow of refrigerant required to be delivered by the variable speed compressor and through the expansion valves to provide a number of cooling Btu's generally equal to the count stored in the $Btu_{total}$ counter, as well as the cycle time over which the mass flow of refrigerant is to be delivered. The speed of the compressor and the degree of opening of the expansion valves are then controlled to deliver the mass flow of refrigerant in a controlled manner over the cycle time determined. As the mass flow of refrigerant is delivered, the count in the $Btu_{total}$ counter is decremented in accordance with the amount of cooling Btu's provided by the refrigeration system. An objective is to calculate the number of Btu's required to properly freeze beverage product flowed into the FCB dispenser, and then operate the refrigeration system in such manner as to efficiently provide the necessary cooling to the dispenser.

Consideration will now be given to the fundamental strategies employed in operation of the refrigeration system in accordance with the prescriptive refrigerant flow control scheme of the invention. An objective is to manage the flow of liquid refrigerant such that sub-cooled liquid is maintained upstream of the expansion valves which, as mentioned, may be of the stepper motor driven or pulse valve modulated type, while minimizing any liquid refrigerant carryover from the evaporators to limit the potential for damage to the compressor. To accomplish this objective, it is contemplated that when there is a count in the $Btu_{total}$ counter representing a cooling load to be satisfied by the refrigeration system, the expansion valves be prescriptively positioned, i.e., be positioned according to predetermined rules or criteria, and the compressor be operated at a selected speed, so as to cause the output from the refrigeration system to match the cooling load associated with drink demand as represented by the count in the $Btu_{total}$ counter.

As mentioned, the total cooling load demand, i.e., the total Btu's required to be extracted from the dispenser freeze barrel by the refrigeration system to satisfy the cooling load demand, can be measured by monitoring the on time of the brix valves supplying beverage product to the FCB dispenser, together with the temperature of the beverage product flowed to the dispenser. For example, the nominal flow of beverage product through a properly adjusted pair of solenoid controlled brix valves supplying water and syrup is on the order of 2.0 oz/sec. An average 16 oz (by volume) drink will deplete some of the barrel contents and will require that the contents be replenished. The time to replenish the contents of a barrel is approximately 4 seconds for a 16 oz (in terms of volume) drink equivalent. The total Btu load imposed on the refrigeration system by the replacement beverage product is equal to the sum of the sensible load plus the freeze load. Each second the sensible load will vary with ambient temperature, but for the purpose of the prescriptive refrigerant control scheme, the sensible load is calculated as follows:

$$Q_{sensible}=2/16 \cdot (T_{ambient}-28)=0.125 \cdot (T_{ambient}-28)$$

For an ambient temperature of 90° F., $Q_{sensible}$=7.75 Btu

The freeze load is a constant value, and is calculated as follows on a per second basis:

$$Q_{freeze}=2/16 \cdot (0.46 \cdot 144)=0.125 \cdot 66.24=8.28 \; Btu$$

This means that 16.03 Btu of heat load ($Q_{ambient}+Q_{freeze}$) is added to the FCB refrigeration system every second that relatively warm product is flowing into the machine as a result of actuation of a pair of brix valves to replenish a freeze barrel. For a 16 oz (by volume) drink equivalent, the total heat added will be approximately 16.03×4 seconds, or 64 Btu's, at a 90° F. ambient condition.

The prescriptive control for the FCB machine determines and counts Btu's of heat flowing into and through the machine and that must be extracted, and as new product flows into the machine, the $Btu_{total}$ counter is incremented by a count in accordance with the number of Btu's of cooling that must be provided by the refrigeration system to chill and freeze the new product. The $Btu_{total}$ counter is updated every second, and during times when no new product flows into the FCB dispenser, the $Btu_{total}$ counter is decremented to zero over a selected period of time, for example over 40 seconds, as Btu's of heat are removed from the dispenser by the refrigeration system. In other words, if no new product flows into the FCB machine, the total number or count of Btu's accumulated in $Btu_{total}$ counter will decrement to zero in 40 seconds and the cooling requirement will then be ended or close to ending. Once the $Btu_{total}$ counter decrements to zero, the final factor that results in a determination that product in the barrels has been properly frozen and the refrigeration system can be turned off is the viscosity of the frozen product in the FCB barrels, which may measured as a function of the magnitude of the current draw of motors for scrapers in the barrels. Under conditions when no drinks are drawn and there is no demand for frozen beverages, the refrigeration system will be operated according to pre-selected cooling rates, just as it will when there is a cooling load requirement to be met.

FIGS. 6-10 illustrate representative operating conditions of the FCB dispenser. The chart of FIG. 6 shows contemplated speeds of operation of the refrigeration system compressor 22, as might be determined by the prescriptive control in order to adjust the output capacity of the compressor in accordance with the count in the $Btu_{total}$ counter. The count in the $Btu_{total}$ counter is related to the cooling load demand placed on the refrigeration system by the dispenser, and in FIG. 6 the count is in accordance with the average number of frozen beverages served per minute. As is seen, based upon the average number of drinks served per minute, and the average number of actuations and the on time per minute of the brixing valves, the speed of operation of the compressor 22 is controlled to provide a variable capacity Btu cooling output by the refrigeration system in accordance with whether the refrigeration system is to meet a maintenance load or a low, medium, high or very high cooling demand of the dispenser.

The chart of FIG. 7 shows how compressor speed may be based upon the FCB dispenser being in pull down, freeze product or maintenance mode.

As seen from the chart of FIG. 8, a drink demand rate in excess of 1×16 oz drink per minute, as determined by on time per minute of the brixing valves, may be considered a period of medium to very high cooling load demand, requiring refrigeration of the freeze barrels 44 and 48 and the pre-chiller 52. The pre-chiller is refrigerated whenever a pair of brixing valves is actuated.

Figure 9:
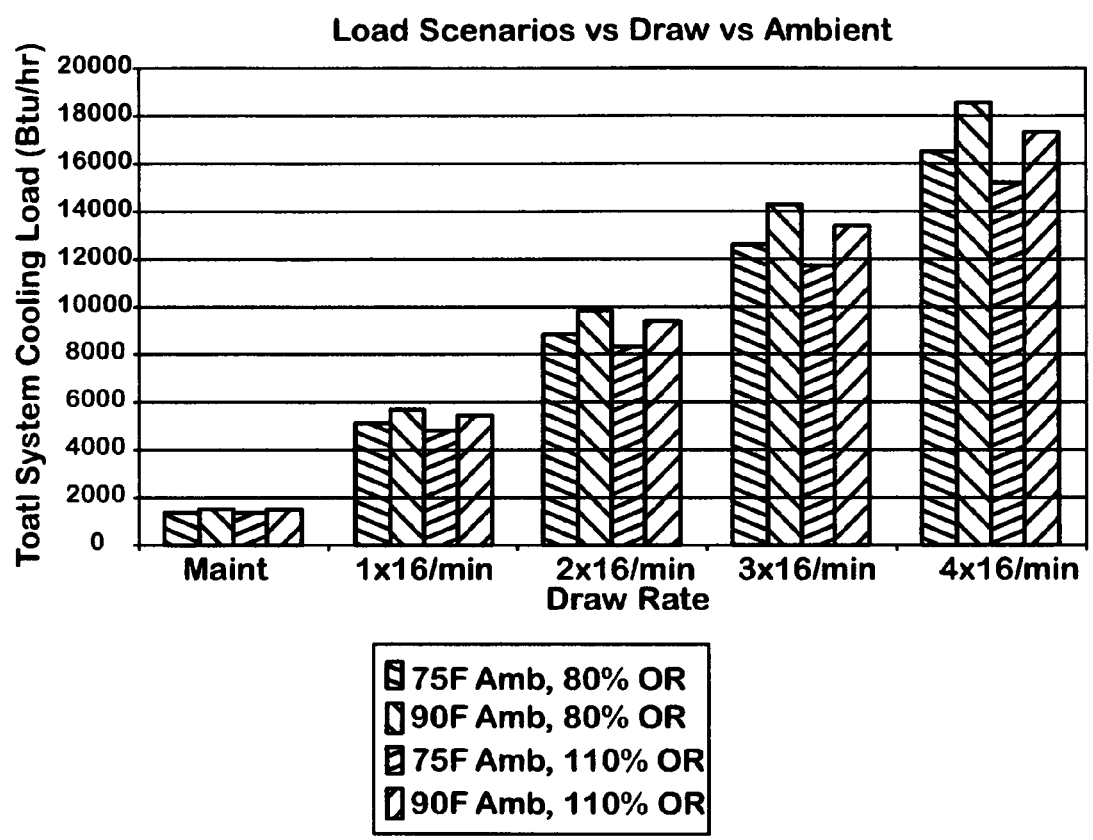
FIG. 9 is a chart showing typical cooling load requirements for a frozen carbonated beverage (FCB) dispenser at various product draw rates and ambient temperatures.

The chart of FIG. 9 shows typical cooling load profiles placed on the refrigeration system by the FCB dispenser at various drink dispense rates and ambient temperatures, where in the legend box to the right of the chart "OR" stands for overrun, which is the amount of beverage in a cup attributable to carbonation.

Figure 10:
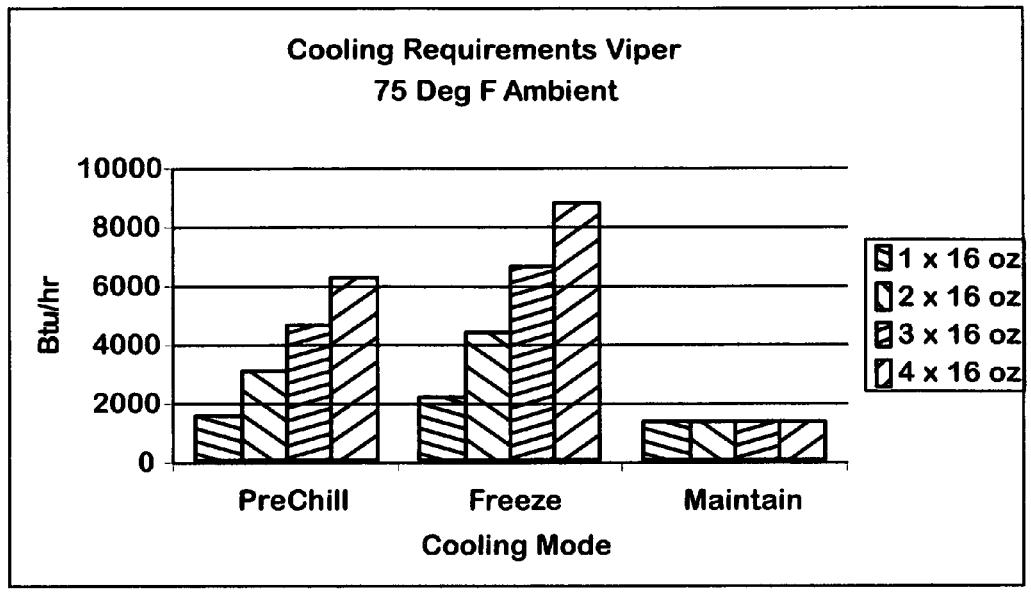
FIG. 10 is a chart showing representative cooling load requirements for an FCB dispenser at an ambient temperature of 75° F. for various product draw rates in each of the three operational modes of maintaining, pre-chilling and freezing beverage product.
Figure 11:
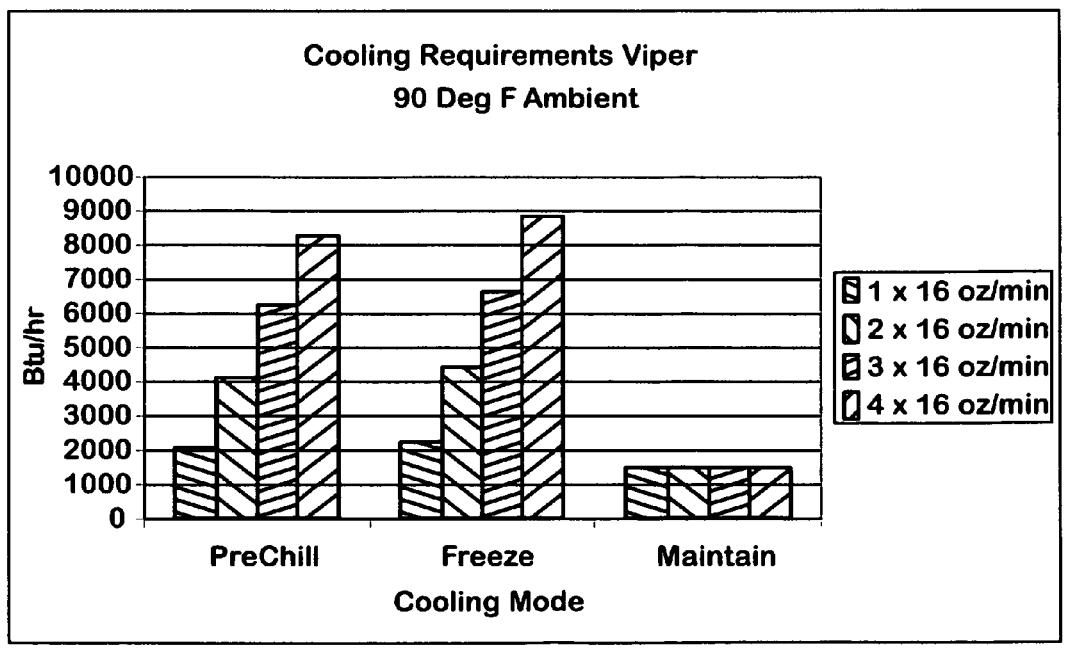
FIG. 11 is a chart similar to the one of FIG. 10, except that the ambient temperature is 90° F.

The chart of FIG. 10 illustrates typical cooling load requirements for the beverage product cooling modes of pre-chilling, freezing and maintenance, at an ambient temperature of 75° F., for various drink draw rates. The chart of FIG. 11 is similar to that of FIG. 10, except that cooling load requirements are shown for an ambient temperature of 90° F.

Figures 12, 13:
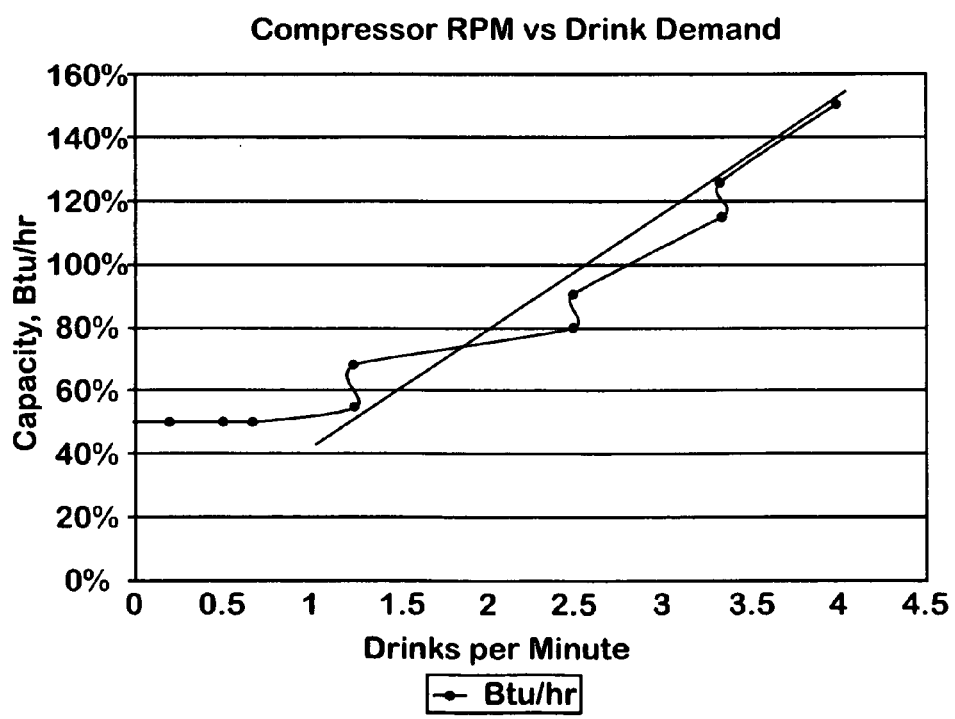
FIG. 12 is a control strategy and function table, showing a contemplated manner of operation of the variable speed compressor of the refrigeration system of FIG. 1 in response to various FCB machine cooling loads.
FIG. 13 is a graph showing various speeds of operation of the refrigeration system compressor in accordance with the number of frozen beverages served per minute.

The control strategy and function table of FIG. 12 shows contemplated manners of operation of the variable speed refrigeration system compressor in response to various FCB machine cooling loads, as represented by drinks drawn per minute and, therefore, the on time per minute of the brix valves. FIG. 13 provides a graphical representation of various possible speeds of operation of the refrigeration system compressor in accordance with the number of frozen beverages served per minute.

In implementing prescriptive refrigerant flow control, the mass flow of refrigerant through the expansion valves for the freeze barrel evaporators is controlled, in accordance with the count in the $Btu_{total}$ counter, by adjustably setting the expansion valves to meter selected amounts of liquid refrigerant within determined cycle times in order to provide selected amounts of cooling for the FCB dispenser. At the same time, the speed of the compressor is controlled so as not to deliver liquid refrigerant to the expansion valves at a rate significantly greater than the valves can meter the refrigerant. To develop a metering setting for the expansion valves, once the volume flow of relatively warm beverage liquid into the dispenser is inferred from a measurement of the on time of the brixing valves and the temperature of the incoming beverage liquid, and the count in the $Btu_{total}$ counter is incremented accordingly, an estimate is developed of the refrigerant mass flow required to chill and properly freeze the beverage liquid flowed into the dispenser. The estimate of refrigerant mass flow may be obtained from a look-up table or calculated directly and, based upon a selected cooling cycle time during which the mass of refrigerant is to flow through the expansion valves, the refrigerant flow rate through the valve may be estimated and, thereby, the valves may be set to metering positions that will accommodate the estimated refrigerant flow rate in the selected cooling cycle time. The initial settings of the expansion valves can be a "best guess", and it is contemplated that either ambient temperature or, alternatively, condensing pressure, may be used as a variable to more precisely prescribe the initial expansion valve settings. The prescriptive controller then fine-tunes the metering settings of the expansion valves.

Figure 14:
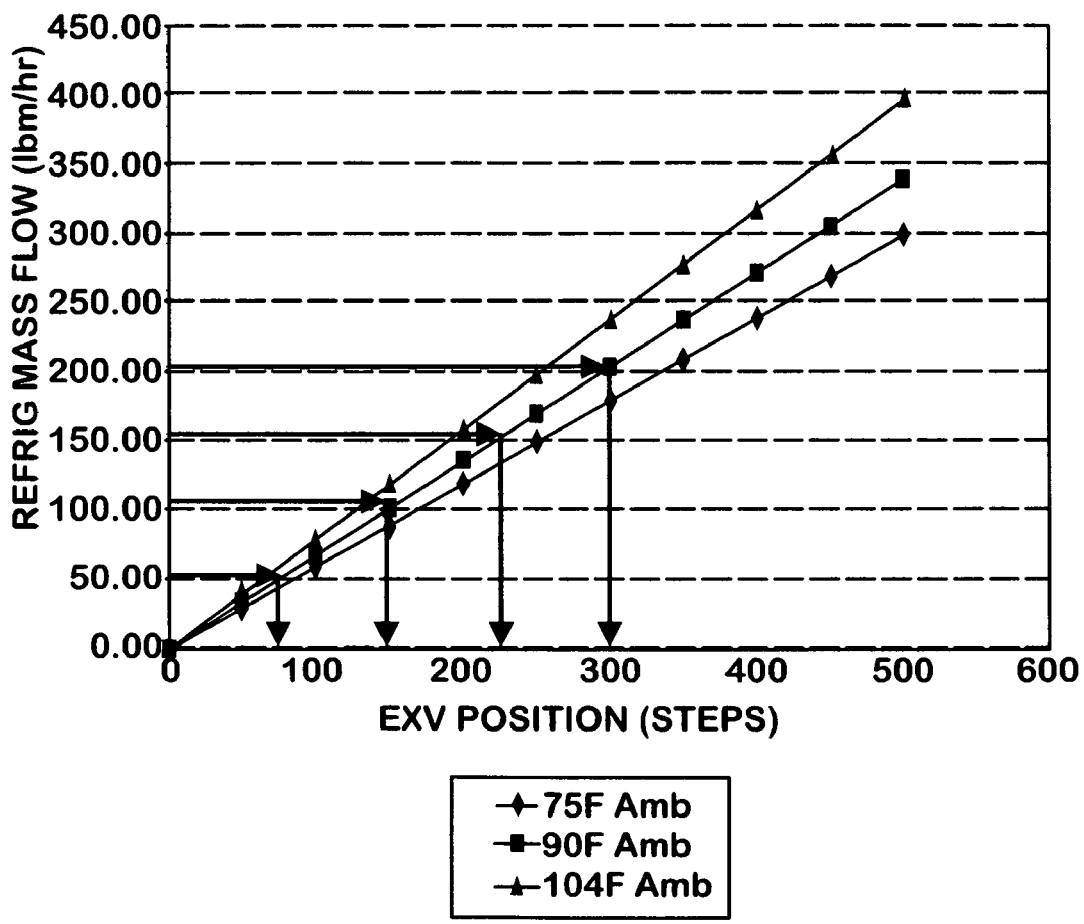
FIG. 14 is a graph showing refrigerant mass flow metered through a stepper motor controlled expansion valve for various ambient temperatures and positions of the valve.
Figure 15:
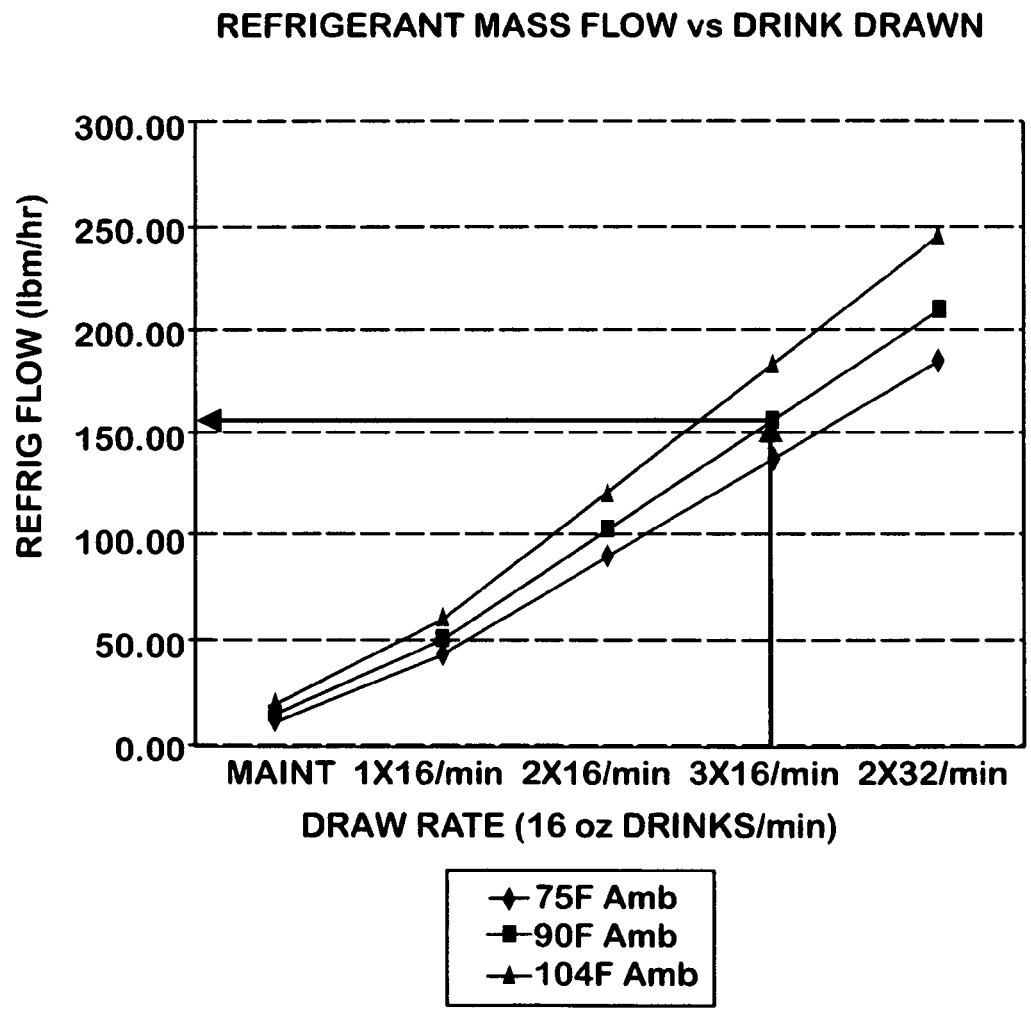
FIG. 15 is a graph showing refrigerant mass flow through the expansion valves for various ambient temperatures and beverage draw rates.
Figure 16:
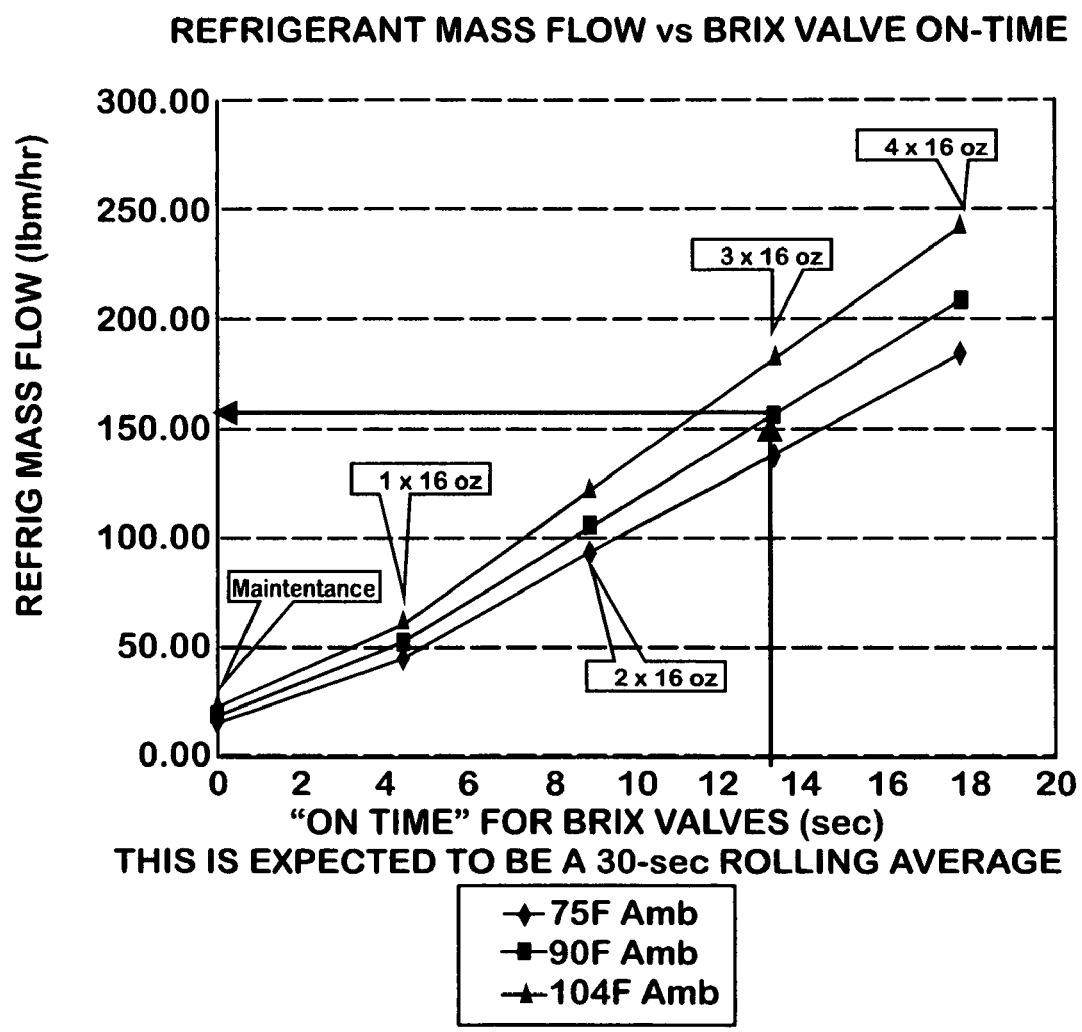
FIG. 16 is a graph showing refrigerant mass flow versus brix valve on time for various ambient temperatures.

The graph of FIG. 14 shows a representative relationship of refrigerant mass flow in pounds mass/hour to expansion valve metering positions in terms of steps of an actuating stepper motor, for ambient temperatures of 75° F., 90° F. and 104° F. The graph of FIG. 15 shows a representative relationship of refrigerant flow in pounds mass/hour to beverage product draw rate, which is inferred from measured brixing valve on-time, for ambient temperatures of 75° F., 90° F. and 104° F. The graph of FIG. 16 shows a representative relationship of refrigerant mass flow in pounds mass/hour to brixing valve on-time, for ambient temperatures of 75° F., 90° F. and 104° F.

One contemplated control strategy for operating the refrigeration system 20 to efficiently responds to dynamically changing broad ranges of cooling load requirements of an FCB dispenser will now be considered in general terms in connection with the FCB dispenser 80 of FIG. 3, it being understood that similar control strategies would apply to use of the refrigeration system with other FCB dispensers, or for that matter in other and differing situations where dynamically changing cooling load requirements need to be quickly and efficiently satisfied. If there is a demand for cooling from a freeze barrel and the refrigeration system compressor 22 is off at the time, then based upon the count incremented into the $Btu_{total}$ counter, the compressor is turned on and operated at a selected speed, and refrigerant is metered through the expansion valve(s) for the freeze barrel(s) at a mass flow rate, commensurate with the cooling load requirement. If at the time of a demand for cooling the compressor is already running, refrigerant is metered through the expansion valves, and the compressor is operated at a speed, in accordance with the then existent cooling load requirements of the dispenser, as indicated by the count in the $Btu_{total}$ counter. If the brix valves have not been actuated for a period of time, it is assumed that beverage product flow rates through the dispenser and, therefore, beverage product cooling load requirements, are low, and that only a maintenance cooling load need be satisfied, under which condition the compressor 22 is brought to a low running speed equal to about 50% of its nominal speed, by application of a 30 Hz AC voltage to the compressor motor.

To develop an indication of customer demand for frozen beverages and, therefore, the cooling load demand of the FCB dispenser, the time of actuation of the brix valves and the ambient temperature of the beverage liquid as flowed into the dispenser are monitored to determine the cooling load to be satisfied. For each drink drawn, the "batch of Btu's" that must be provided by the refrigeration system to chill and properly freeze replenishment beverage product is incremented into the $Btu_{total}$ counter, and as multiple drinks are drawn, the batches multiply and the count in the $Btu_{total}$ counter increases. The flow rate of water and syrup through the brixing valves can be closely approximated, so the amount of replenishment beverage product delivered by the brixing valves to the freeze barrels can be correlated with the on-time of the brixing valves, which in turn relates to the cooling load that must be met by the refrigeration system. The cooling load, in terms of Btu's required to chill and freeze each batch of beverage product flowed from the brixing valves, can be calculated and is based upon two factors: 1) the size of the batch, which is directly related to on-time of the brixing valves, and 2) the ambient temperature of the beverage components delivered by the brixing valves. As additional beverage product is delivered by the brixing valves, the $Btu_{total}$ counter is updated and incremented on a second by second basis, while at the same time, as the refrigeration system extracts heat from the FCB dispenser, the count in the $Btu_{total}$ counter is decremented in accordance with the cooling Btu's supplied by the refrigeration system. During times when frozen drinks are not being dispensed and no new beverage product flows from the brixing valves, the refrigeration system continues to run as necessary to extract heat from the dispenser and to decrement the count in the $Btu_{total}$ counter to zero over a selected period of time that may be, for example, on the order of 40 seconds. Consequently, if no new product flows from the brixing valves for the selected time, the count accumulated in the $Btu_{total}$ counter will be decremented to zero and the cooling requirement of the refrigeration system will be close to ending. However, while the count in the $Btu_{total}$ counter is intended to represent the total cooling load requirements of the FCB dispenser, some inaccuracies can exist, and decrementing the $Btu_{total}$ counter to zero is therefore not determinative to turning off the refrigeration system. The final factor that shuts off the refrigeration system is the measured viscosity of the frozen beverage product, which may be measured as a function of the sensed current draw of motors for the freeze barrel scrapers.

Since the count in the $Btu_{total}$ counter is indicative of the immediate cooling load demand placed on the refrigeration system 20 by the FCB dispenser 80, should the count be increasing and indicate that cooling load requirements are increasing faster than they are being met, then an increase in compressor speed and/or refrigerant metering rate of the expansion valves is required to increase the Btu output capacity of the refrigeration system. In this case, the speed of the compressor can be initially incremented by 10% of its present speed, such that should the compressor be operating at 50% nominal speed, then the frequency of the AC voltage applied to the compressor motor would be increased by 10% to increment compressor speed to 55% nominal speed. However, during pull-down, as will be described below and as occurs when the FCB dispenser is initially turned on, the increment in compressor speed will be more aggressive, for example on the order of 50% to 60% every 5 seconds.

Pull-down mode occurs when the FCB dispenser 80 is first turned on after being off, such that the freeze barrels 44 and 48 are warm. Under this circumstance, the refrigeration system 20 is controlled to quickly drop the temperatures of the freeze barrels, the objective being to rapidly bring product in the barrels to within predetermined temperature and viscosity ranges, so that warm drinks are not dispensed. Product temperature may be determined by temperature sensors and product viscosity is related to, and may be determined in accordance with, a measurement of current draw in amperes of each motor that rotates a scraper in an associated one of the barrels. In pull-down mode, the compressor 22 is turned on and the expansion valves 36 and 38 are controlled to meter refrigerant to the evaporators of the freeze barrels. When the compressor is first turned on, it is contemplated that it be run at about 50% nominal speed and then be ramped up in speed from 50% nominal speed to 150% nominal speed over a selected period of time, for example over 25 seconds, in which case compressor speed would be increased in increments of about 10% every 5 seconds. Product is not to be dispensed from a freeze barrel if its temperature is above and its viscosity is below predetermined ranges or specifications, so a lock for the dispense valve 82 can be provided to prevent dispensing of product from the valve when beverage temperature is above or beverage viscosity is below specification, or when the barrels are being defrosted.

As the freeze barrels 44 and 48 are cooled, beverage product within the barrels will be brought to a desired temperature range, generally between about 24° F. to 28° F., and the viscosity of the product, as determined by sensed scraper motor current draw, will be brought to between a selected Lo Limit Value and Hi Limit Value. Once product in the barrels is brought to within the selected temperature and viscosity ranges, the compressor is turned off until further refrigeration is required. The schedule for compressor speed operation advantageously is based upon demand for drinks dispensed, as represented by the on-time of the brixing valves, since it is the relatively warm beverage mixture delivered into the FBC machine that must be chilled and that places a cooling load on the refrigeration system 20. When no frozen beverages are being dispensed, barrel maintenance occurs, during which periods barrel refrigeration may be initiated if product viscosity drops to the Lo Limit Value or product temperature increases to at least the upper end of the selected temperature range. To reduce beverage product temperature before delivery of the product to a freeze barrel, whenever a pair of brix valves 102, 84 and 104, 87 is actuated to deliver beverage product mixture to a freeze barrel, the pre-chiller expansion valve 40 is operated to cool the pre-chiller 52. It is contemplated that pre-chilling begin as soon as there is a call for the brix valves to open, since refrigeration of just the freeze barrels may not be sufficient to meet cooling loads that are both high and sustained.

The product freeze barrels 44 and 48 are automatically refilled based upon internal barrel pressure. For example, when the cut in/cut out pressure sensor 124 detects pressure within the freeze barrel 44 decreasing to about a 20 psi cut-in pressure, the brix valves 102, 84 are opened to provide beverage product through the pre-chiller 52 to the barrel, and a similar operation occurs in refilling the freeze barrel 48. During refilling of a freeze barrel, the electronic expansion valve 40 is opened to meter refrigerant to the evaporator 50 to cool the pre-chiller, so that the beverage mixture is chilled before being delivered into the barrel. The brix valves then remain open until internal freeze barrel pressure reaches about a 28 psi cut-out pressure, whereupon the brix valves are closed. If necessary, all three evaporators 42, 46 and 50 can be cooled simultaneously to facilitate pre-chilling and freezing of product in both barrels simultaneously, since the compressor 22 is selected to have sufficient capacity to handle such a maximum cooling load. In order that a non-flowing beverage mixture within the pre-chiller will not be frozen, the pre-chiller is not cooled by itself in the absence of a need to cool at least one of the product freeze barrels 44 and 48. Upon the brixing valves closing and the temperature of the beverage product in the pre-chiller dropping to about 36° F., the expansion valve 40 for the pre-chiller is closed, although continued cooling of beverage product in the pre-chiller will continue for a limited time due to thermal storage capacity of the pre-chiller. Upon the temperature and viscosity of beverage product in each freeze barrel 44 and 48 being brought to within the selected temperature and viscosity ranges, the compressor 22 is turned off.

If when the compressor 22 is running at a relatively high output capacity there is little or no heat load imposed by the product barrels 44 and 48, or if demand for product suddenly stops, there will very quickly be excess and unutilized compressor cooling capacity. If the compressor were to continue running in that mode, the expansion valves 36 and 38 would close down and suction pressure at the outlets from the evaporators 42 and 46 would drop to a very low value. The compressor would then pull down the temperature of product in the barrels and would have to be shut off to prevent excessive freezing of product. To alleviate this potential problem, the capacity of the refrigeration system 20 is varied by varying the speed of the compressor, such that as cooling load demand drops, as may be measured by a reduction in the count in the $Btu_{total}$ counter, compressor speed is reduced in 5% increments, until 50% nominal speed is achieved. Advantageously, compressor speed should be reduced to 50% nominal speed before barrel product temperature and viscosity conditions are fully satisfied, or before compressor suction pressure (or saturated evaporator temperature) drops to a selected lower limit. Since cooling load demand is conveniently defined in terms the brixing valves 102, 84 and 104, 87 being actuated or opened, cooling loads may be considered to be high if the brixing valves are actuated more than 2 times per minute, and may be considered low if the brixing valves are actuated less than 2 times per minute. It is contemplated that if actuation of a pair of brixing valves is less frequent than 1×16 oz drink per minute, the compressor can be operated at 50% speed. When compressor speed is reduced and refrigeration cooling capacity is reduced, a saturated evaporator temperature of about 4° F. will continue to cool product in a barrel, until both temperature and viscosity conditions of product in the barrel are satisfied, whereupon the compressor shuts off and the speed of the beater bar or scraper in the barrel may be reduced to half speed.

There are four modes of operation for the FCB dispenser 80 when the refrigeration system is active, as seen in FIG. 17. A first mode is for pull-down, which occurs when the FCB dispenser is warm and first turned on, at which time it is desirable to quickly bring product in the freeze barrels to its desired temperature and viscosity ranges. During pull-down the refrigeration system is maintained at a first fixed cooling output in which a fixed expansion valve position is modified by the cooling rate and system differential pressure. A second mode is for maintenance, which occurs when the dispenser is idle and drinks are not being drawn and during which the refrigeration system is maintained at a selected second fixed cooling output in which a fixed expansion valve position is modified by the cooling rate and system differential pressure. A third mode is glide mode, which occurs when product in a barrel is approaching, but has not quite reached, its maximum viscosity. It is desirable to prevent the viscosity of the product from overshooting its maximum value, so in glide mode cooling is continued, but reduced below that for maintenance mode, and the refrigeration system is operated at a third fixed cooling output in which a fixed expansion valve position is selected as a percentage of what would be the maintenance mode position. A fourth mode is a demand for drinks mode, in which the refrigeration system is operated to have a variable cooling rate and in which the expansion valves have a modified position based upon both cooling rate, which is updated every second, and refrigeration system differential pressure.

Figure 18:
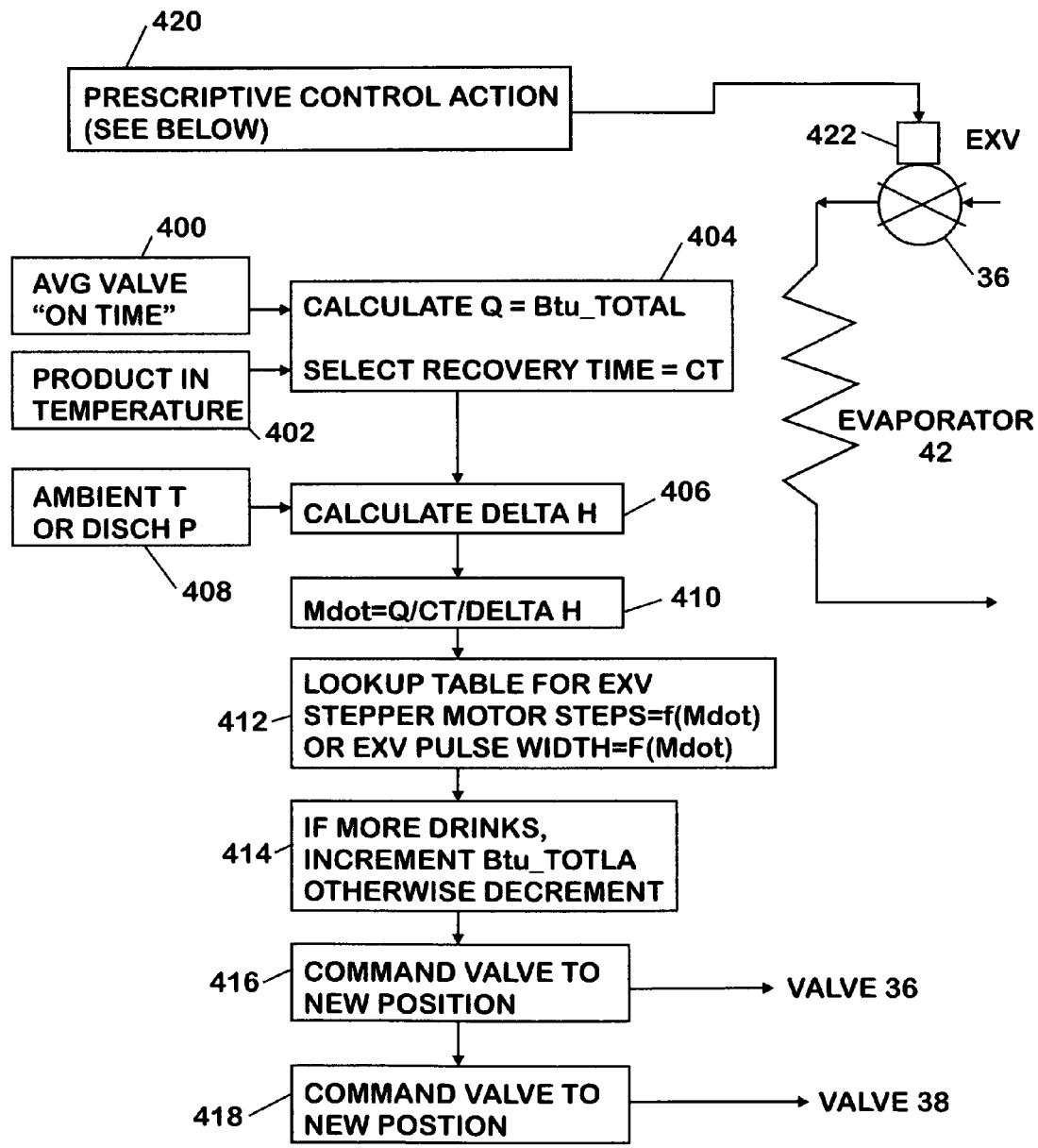
FIG. 18 is a schematic of a prescriptive refrigerant flow control strategy for the refrigeration system expansion valves.

FIG. 18 illustrates a contemplated prescriptive control strategy for setting the metering position of the refrigeration system expansion valves 36 and 38, to provide selected refrigerant flows through the valves to the freeze barrel evaporators 42 and 46. To implement the strategy, at a box 400 the average on time of a pair of brix valves, and at a box 402 the temperature of beverage product flowed through the FCB dispenser in response to actuation of the brix valves, are measured and input to a box 404. At the box 404, the inputs are used to determine the total Btu output Q that is required to be provided by the refrigeration system to chill and properly freeze the beverage product flowed through the brix valves, and a determination is also made of a cycle time CT in which the cooling demand is to be satisfied. The value of CT can be determined from a look-up table based upon the value of the count in the $Btu_{total}$ counter, and at a box 406 the values of Q and CT, along with the value of either ambient temperature or refrigeration system high side pressure as are detected at a box 408, are used to calculate the change in enthalpy ΔH that is required to fully vaporize a mass of refrigeration liquid as will be required to properly freeze the beverage product flowed from the brix valves. At a box 410, the mass flow of refrigerant $M_{dot}$ in pounds per hour is determined in accordance with the values of Q, CT and ΔH, and based upon the value of $M_{dot}$, at a box 412 a determination is made, from a look-up table, as to the number of steps to drive a stepper motor if the expansion valve is stepper motor driven, or as to a pulse width to be used if the expansion valve is of a pulse valve modulated type, in order to position the expansion valve to meter the determined mass flow of refrigerant $M_{dot}$ in the selected cycle time CT. At a box 414, a determination is made as to whether to increment the $Btu_{total}$ counter if additional drinks are drawn, or to decrement the counter if no further drinks have been drawn, by a count in accordance with the value of Q i.e., the number of Btu's that are to be provided by the refrigeration system. Depending upon which expansion valve 36 or 38 is to be controlled, at a box 416 a command is generated to position the expansion valve 36, or at a box 418 a command is generated to position the expansion valve 38, according to the number of stepper motor steps or pulse width as determined at the box 412. The command is implemented at a box 420, which applies a control signal to an expansion valve driver, such as a driver 422 for the expansion valve 36.

As seen in FIGS. 19A and 19B, a microprocessor controls operation of the FCB dispenser and its refrigeration system. The microprocessor implements the prescriptive control and includes the $\text{Btu}_{total}$ counter. In implementing the prescriptive control, the microprocessor receives inputs from the FCB dispenser in accordance with control strategies that are to be implemented and that enable a determination as to the state of the cooling demand. For example, since barrel refrigeration affects product temperature and product viscosity, and since as product temperature goes down product viscosity goes up, it is contemplated that the cooling capacity of the refrigeration system 20 be decreased by reducing the refrigerant flow rate and drying out the evaporator coil in accordance with the count in the $\text{Btu}_{total}$ counter. Also, based upon a pressure differential between compressor suction and discharge, it is contemplated that the expansion valves be pre-positioned to a selected setting, which setting can be in accordance with the count in the $\text{Btu}_{total}$ counter. In addition, it is contemplated that as cooling load increases or decreases, as determined by the change in the count in the $\text{Btu}_{total}$ counter, the speed of the compressor be modulated proportionally to the change in cooling load. Also, once the cooling load drops below the modulating speed range of the compressor, continued modulation of the cooling capacity of the refrigeration system 20 may be accomplished by modulating the position of the expansion valves in accordance with the count in the $\text{Btu}_{total}$ counter, as determined by brix valve actuation.

Before considering the FIG. 20 flow chart depicting operation of the refrigeration system and frozen product dispenser cooled by the refrigeration system, certain relationships between cooling loads, compressor speeds and expansion valve metering positions will be discussed in general terms. Ideally, the expansion valve metering position is determined by matching the liquid refrigerant flow rate through the expansion valve and the compressor pumping rate. As the cooling load placed on the evaporator by the dispenser drops off, the compressor will have excess capacity, and the capacity of the compressor must be reduced using modulation techniques, such as by reducing the compressor speed. Conversely, if the cooling requirement increases, as measured by the amount of liquid product flowing through the dispenser to a freeze barrel, the compressor speed must be increased. As compressor speed is modulated, the expansion valve metering position is controlled to be in accordance with compressor pumping rate, and the intention of the prescriptive refrigerant flow control is for the expansion valve metering position to closely, but not necessarily perfectly, match the compressor pumping rate. However, the expansion valve metering position, while it can be directly responsive to compressor speed, need not be directly responsive. The variable speed compressor can be prescriptively controlled to respond directly to cooling load changes, as measured by brix valve on time. At the same time, the expansion valve metering position can also be prescriptively controlled to respond directly to brix valve on time. Therefore, each of compressor speed and expansion valve metering position can be separately and independently prescriptively controlled as a function of brix valve on time, and it is not necessary that there be a direct dependency of one on the other, but rather each can be made to independently track cooling load as measured by brix valve on time.

Advantages are obtained by having the prescriptive expansion valve metering settings be responsive to cooling load changes and not compressor speed changes. The range over which the compressor is able to respond to changing cooling loads is limited and does not necessarily encompass the entirety of the cooling load range. Once the limits of compressor speed modulation are reached, then the expansion valves must continue to open or close, based upon increases or decreases in cooling load requirements, and at that point a dependency of expansion valve metering position on compressor speed would no longer be valid. At low cooling loads, where minimum compressor capacity has been reached, the expansion valves must further restrict refrigerant flow to avoid liquid carryover from the evaporators. On the other hand, at high loads where maximum compressor capacity has been reached and is less than evaporator cooling capacity, the expansion valve must open up to increase the evaporator cooling capacity. In the case of a fixed speed compressor, the need to track cooling load becomes most apparent, while the dependency of the expansion valve metering position on compressor speed becomes non-existent.

Figure 20:
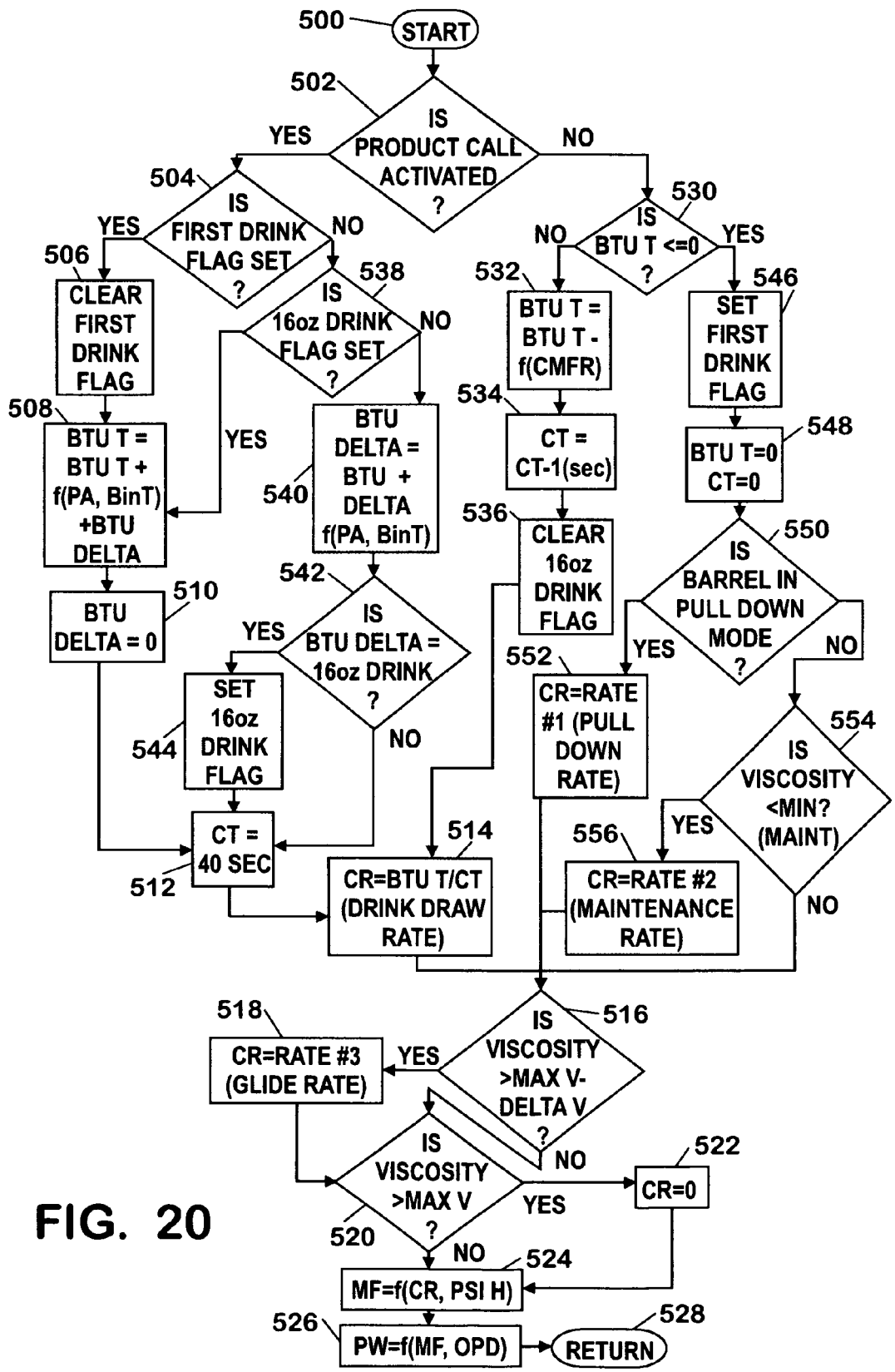
FIG. 20 is a flow chart illustrating the prescriptive refrigerant flow control scheme of the invention.

The flow chart of FIG. 20 illustrates operation of the refrigeration system in providing cooling for an FCB dispenser in accordance with the prescriptive refrigerant flow control scheme of the invention, as may be implemented by the FIG. 19A CPU. The chilling of each freeze barrel of the dispenser is separately prescriptively controlled, such that control over chilling of each freeze barrel would be represented by a separate flow chart. The flow chart therefore applies to just one freeze barrel and its associated evaporator, expansion valve and brix valves, and it will therefore be described in connection with providing cooling for just a single freeze barrel of the dispenser. However, it is to be appreciated that a similar but separate control is implemented by the CPU for each additional freeze barrel and its associated evaporator, expansion valve and brix valves, and that while chilling of each freeze barrel is separately controlled, all of the freeze barrels of the dispenser share the refrigeration system compressor 22 as well as the various sensors as are indicated in FIG. 19B.

The prescriptive refrigerant flow control scheme is performed cyclically, on the order of once per second. Beginning at a start 500, at a box 502 it is determined whether a product call exists, i.e., whether the brix valves have been actuated to deliver relatively warm beverage product to a freeze barrel of an FCB dispenser. If the brix valves have been actuated, at a box 504 it is determined whether a first drink flag is set, which first drink flag is set in response to the brix valves being closed at a time while the compressor 22 is off. If a first drink flag has been set, it is cleared at a box 506 and at a box 508 the count BTU T in the $\text{Btu}_{total}$ counter is made equal to:

$$BTUT = BTUT + f(PA, BinT) + \Delta BTU$$

where: $f(PA, BinT) = (PA \cdot PFR/16) \cdot [(BinT - 28) \cdot Cp + 144 \cdot 0.46]$ and: PA is product call or brix valve actuation time in seconds;
PFR is the product mass flow rate and equals 2 ounces mass/second;
16 is for a conversion to pounds mass/second;
28 is the temperature in ° F. at which the product will freeze;
BinT is the temperature of product delivered into the freeze barrel in ° F.;
Cp is the specific heat of water;
144 is the Btu/pound mass required to freeze water;
0.46 is the ice fraction for an FCB drink; and
$\Delta BTU$ is the cumulation of BTUs in the $\text{BTU}_{total}$ counter as a result of additional beverages being drawn prior to the BTU demand resulting from the first beverage drawn being satisfied.

At a box 510, $\Delta BTU$ is set to zero, and at a box 512 the cycle time CT is read, which cycle time CT can be selected and changed, but once selected normally remains fixed. The cycle time CT may be on the order of about 40 seconds, and is the time period in which the refrigeration system 20 is operated to provide to the freeze barrel an amount of cooling equivalent to the number of Btu's indicated by the count BUT T in the $Btu_{total}$ counter, thereby to freeze the relatively warm beverage product delivered by the brix valves to the freeze barrel. At a box 514, the cooling rate CR of the freeze barrel in Btu's/second, which is the rate at which the freeze barrel is to be chilled by the refrigeration system in order to freeze product in the barrel within the cycle time CT, is determined according to the formula:

$$CR = BTUT/CT$$

where CR is expressed in Btu/second and is the instantaneous cooling rate of the freeze barrel evaporator. The count BTU T in the $Btu_{total}$ counter is decremented as the freeze barrel is chilled, but it is not the value of BTU T that determines when sufficient cooling has been provided for the freeze barrel. Instead, the viscosity of beverage product in the freeze barrel, as represented by the current draw of a motor for a scraper in the barrel, is determinative as to when sufficient cooling has been provided by the refrigeration system, and at a box 516 a determination is made whether:

$$V > \text{Max } V - \Delta V$$

where V is the product viscosity, Max V is the maximum viscosity the product is to be brought to, and $\Delta V$ is a predetermined viscosity value for the frozen beverage at which point the glide rate of refrigerant flow control is to be implemented. If product viscosity is greater than Max V−ΔV, at a box 518 the cooling rate CR of the freeze barrel evaporator is changed to a glide rate, which is a reduced and predetermined rate of cooling that is used when product viscosity is close to its maximum viscosity Max V, so that the product is brought to Max V relatively slowly and with minimal overshoot. From either the box 516 or the box 518, the control goes to a box 520 where it is determined if product viscosity V is greater than Max V, and if it is that indicates that product in the freeze barrel has been sufficiently cooled and at a box 522 the refrigeration system 20 is controlled so that the cooling rate CR of the freeze barrel evaporator is brought to zero, which is accomplished by closing the expansion valve for the evaporator. From the box 522, as well as from the box 520 if a determination is made that product viscosity V is less than Max V, the control goes to a box 524 where the mass flow MF of refrigerant to be provided by the refrigeration system compressor 22 and metered by the expansion valve for the freeze barrel evaporator is determined according to the formula:

$$MF = f(CR, PSIH)$$

where: $f(CR, PSIH) = CR/(91.47 - (0.1125 \cdot PSIH + 13.696))$ and: 91.47 is the estimated enthalpy value for refrigeration system low side at 10° F.;
PSI H is the refrigeration system high side pressure; and
0.1125·PSI H+13.696 is the enthalpy value for refrigeration system high side.
After determining MF, at a box 526 the value of PW, which can represent either the number of steps to drive a stepper motor or the pulse width to be used to control the metering rate of the expansion valve, depending on whether the expansion valve is stepper motor or pulse width driven, is determined according to:

$$PW + f(MF, OPD)$$

where OPD is the refrigeration system operating pressure differential (PSI H−PSI L). Having determined PW, the metering rate of the expansion valve is adjusted accordingly, such that the instantaneous cooling rate of the expansion valve is brought to the determined cooling rate CR, and at a box 528 the prescriptive refrigerant flow control returns to start 500.

If, after beginning at the start box 500, at the box 502 it is determined that there is no product call activated such that the brix valves are closed, at a box 530 it is determined whether the count BTU T in the $Btu_{total}$ counter is less than or equal to zero. If it is not and BTU T is greater than zero, at a box 532 BTU T is reset according to:

$$BTUT = BTUT - f(CMFR)$$

where CMFR is compressor refrigerant mass flow rate and may either be calculated according to f(PSI H−PSI L) or determined through use of either a look-up table for the compressor or a look-up table for the expansion valve. At a box 534, the remaining cycle time CT in which the refrigeration system is to provide the required cooling to the evaporator of the freeze barrel is decremented by one second, and at a box 536 a cooling flag for a standard 16 ounce beverage is cleared. Then, at the box 514 the cooling rate CR is determined, following which the prescriptive refrigerant control proceeds as above described.

If, after beginning at the start box 500 and determining at the box 502 that the brix valves are actuated, it is determined at the box 504 that the first drink flag has not been set, the control proceeds to a box 538. If the first drink flag is not set, which is the case on the second pass through the flow chart following actuation of the brix valves while the refrigeration system is providing cooling to the freeze barrel evaporator, or if the brix valves are again actuated to deliver beverage product to the freeze barrel while the refrigeration system is chilling the freeze barrel evaporator, then at the box 538 it is determined if a 16 ounce drink flag is set. The 16 ounce drink flag is set when the brix valves are actuated to deliver product to the freeze barrel incident to service of a second, third, fourth, etc. drink, while the refrigeration is still operating to satisfy freeze barrel cooling requirements. If the 16 ounce drink flag is set, then the cycle moves to the box 508, from which it proceeds as above described. On the other hand, if the 16 ounce drink flag is not set, then at a box 540 ΔBTU, which is the change in cooling load placed on the refrigeration system as represented by the count BTU T in the $Btu_{total}$ counter, is updated according to:

$$\Delta BTU = \Delta BTU + f(PA, BinT)$$

where again PA is brix valve actuation or opening time in seconds and Bin T is the temperature of product delivered to the freeze barrel inlet in ° F. If at a box 542 it is determined that the change in cooling requirements, ΔBTU, is equal to that required to freeze a 16 ounce beverage, at a box 544 a 16 ounce drink flag is set and the cycle advances to the box 512. On the other hand, if at the box 542 it is determined that the change in cooling requirements ΔBTU does not equal that required to freeze a 16 ounce drink, then the cycle advances directly to the box 512. From the box 512, the cycle proceeds as above described.

If at the box 502 it is determined that brix valves are not actuated and if at the block 530 BTU T is less than or equal to zero, then it is assumed that the refrigeration system has satisfied its freeze barrel cooling requirements and at a box 546 a first drink flag is set and at a box 548 both the count BTU T in the $Btu_{total}$ counter and the cycle time CT are set to zero. A determination is then made, at a box 550, whether the freeze barrel is in pull-down mode. If it is in pull-down mode, then at a box 552 the cooling rate CR is set to or maintained at a predetermined increased cooling rate to rapidly chill the freeze barrel, and the control then proceeds from the box 516 in the manner above described. On the other hand, if at the box 550 it is determined that the barrel is not in pull-down mode, at a box 554 it is determined if product viscosity V is less than a predetermined minimum viscosity. If the viscosity is greater than the predetermined minimum, the control proceeds from the box 516 in the manner above described. On the other hand, if product viscosity is less than the predetermined minimum, at a box 556 the cooling rate CR is set to a pre-selected maintenance level, whereupon at the box 516 the control proceeds as above described.

While embodiments of the invention have been described in detail, various modifications and other embodiments thereof may be devised by one skilled in the art without departing from the spirit and scope of the invention, as defined by the appended claims.

What is claimed is:

1. A refrigeration system, comprising:
   an evaporator heat exchange coupled to a load to be chilled to within a selected temperature range;
   an adjustable expansion valve for metering refrigerant to said evaporator;
   a variable speed compressor for delivering refrigerant to said expansion valve;
   means for sensing a chilling requirement placed on said refrigeration system by the load that is to be provided by said refrigeration system in order for said refrigeration system to cool the load to within the selected temperature range;
   means responsive to said sensing means for selecting the duration of a time interval during and throughout which said refrigeration system is to provide the sensed chilling requirement to the load;
   means responsive to each of said sensing and selecting means for operating said refrigeration system to control the speed of said compressor to deliver refrigerant to said expansion valve, and to adjust said expansion valve to meter refrigerant to said evaporator, at flow rates such that said refrigeration system provides the sensed chilling requirement to the load during and throughout the selected time interval, whereby said refrigeration system provides a cooling output over a selected time interval that closely matches the chilling requirement of the load;
   wherein the load is a frozen product dispenser and said evaporator is heat exchange coupled to a freeze barrel of the frozen product dispenser to chill product in the freeze barrel to within the selected temperature range, the freeze barrel being of a type from which frozen product is dispensed and into which relatively warm product is flowed to replace dispensed product, whereby the freeze barrel places on said refrigeration system a chilling requirement that varies in accordance with the quantity and temperature of the flows of relatively warm replacement product into the freeze barrel, so that said operating means operates said refrigeration system to control the speed of operation of said compressor to deliver refrigerant to said expansion valve, and to adjust said expansion valve to meter refrigerant to said evaporator, at flow rates such that said refrigeration system provides the sensed chilling requirement to the freeze barrel during and throughout the selected time interval; and
   wherein said sensing means comprises means for monitoring the quantity and temperature of relatively warm replacement product flowed into the freeze barrel, and means responsive to said monitoring means for determining the number of Btu's of cooling required to be provided by said refrigeration system to the freeze barrel to chill product in the freeze barrel to within the selected temperature range, said operating means being responsive to said sensing means and said selecting means to operate said refrigeration system to have a cooling capacity closely matching the immediate and dynamically changing chilling requirements of the freeze barrel.

2. A refrigeration system as in claim 1, said sensing means including a Btu counter and means responsive to said determining means upon each flow of relatively warm product into the freeze barrel for incrementing into said Btu counter a count in accordance with the determined number of Btu's of cooling required to be provided by said refrigeration system to chill the product then flowed into the freeze barrel to within the selected temperature range, and means for decrementing the cont in said Btu counter by the number of Btu's of cooling provided by said refrigeration system to product in the freeze barrel, whereby the instantaneous count in said Btu counter is representative of the number of Btu's of cooling then required to be provided by said refrigeration system to chill product in the freeze barrel to within the selected temperature range.

3. A method of operating a refrigeration system for a frozen product dispenser having a freeze barrel from which frozen product is periodically dispensed and into which relatively warm product if flow to replace dispensed product, whereby the freeze barrel places on the refrigeration system a heat load that varies in accordance with the quantity and temperature of relatively warm replacement product periodically flowed into the freeze barrel, said method comprising the steps of:
   heat exchange coupling an evaporator to the freeze barrel to chill product in the freeze barrel to within a selected temperature range;
   metering refrigerant through an adjustable expansion valve to the evaporator;
   delivering refrigerant to the expansion vale with a variable speed compressor;
   sensing a chilling requirement placed on the refrigeration system by a flow of relatively warm product into the freeze barrel, that is to be provided by the refrigeration system in order for the refrigeration system to cool the product to within the selected temperature range;
   selecting, in response to performance of said sensing step, the duration of a time interval during and throughout which the refrigeration system is to provide the sensed chilling requirement; and
   operating the refrigeration system, in response to performance of said sensing and selecting steps, to control the speed of operation of the compressor to deliver refrigerant to the expansion valve, and to adjust the expansion valve to meter refrigerant to the evaporator, at flow rates such that the refrigeration system provides the sensed chilling requirement during and throughout the selected time interval;
   wherein said sensing step comprises the step of monitoring the quantity and temperature of relatively warm replacement product flowed into the freeze barrel and, in response to said monitoring step, determining the number of Btu's of cooling required to be provided by the refrigeration system to chill the relatively warm replaced product flowed into the freeze barrel, and thereby the product in the freeze barrel, to within the selected temperature range during the selected time interval.

4. A method of operating a refrigeration system for a frozen product dispenser having a freeze barrel from which frozen product is periodically dispensed and into which relatively warm product if flow to replace dispensed product, whereby the freeze barrel places on the refrigeration system a heat load that varies in accordance with the quantity and temperature of relatively warm replacement product periodically flowed into the freeze barrel, said method comprising the steps of:

heat exchange coupling an evaporator to the freeze barrel to chill product in the freeze barrel to within a selected temperature range;

metering refrigerant through an adjustable expansion valve to the evaporator;

delivering refrigerant to the expansion vale with a variable speed compressor;

sensing a chilling requirement placed on the refrigeration system by a flow of relatively warm product into the freeze barrel, that is to be provided by the refrigeration system in order for the refrigeration system to cool the product to within the selected temperature range;

selecting, in response to performance of said sensing step, the duration of a time interval during and throughout which the refrigeration system is to provide the sensed chilling requirement; and operating the refrigeration system, in response to performance of said sensing and selecting steps, to control the speed of operation of the compressor to deliver refrigerant to the expansion valve, and to adjust the expansion valve to meter refrigerant to the evaporator, at flow rates such that the refrigeration system provides the sensed chilling requirement during and throughout the selected time interval;

said sensing step comprising the steps of incrementing into a Btu counter, in response to a flow of relatively warm product into the freeze barrel, a count representative of the number of Btu's of chilling required to be provided by the refrigeration system to the freeze barrel in order to chill the product flowed into the freeze barrel, and thereby the product in the freeze barrel, to within the selected temperature range, and decrementing the count in the Btu counter, in response to chilling of product in the freeze barrel by the refrigeration system, by the number of Btu's of chilling provided by the refrigeration system to the freeze barrel, whereby the instantaneous count in the Btu counter is representative of the number of Btu's of cooling yet required to be provided by the refrigeration system to chill product in the freeze barrel to within the selected temperature range.

5. A method as in claim 4, wherein said operating step adjusts the metering rate of the expansion valve and controls the operating speed of the compressor so that the refrigeration system has a cooling output, during the selected time interval, that closely matches the chilling requirement of the freeze barrel and that varies directly in accordance with the magnitude of the count in the Btu counter.

6. A method as in claim 4, wherein said sensing step is performed such that, in the absence of a flow of relatively warm product into the freeze barrel, the count in the Btu counter will be decremented to zero by the end of the selected time interval.

7. A method of operating a refrigeration system for a frozen product dispenser having a freeze barrel from which frozen product is periodically dispensed and into which relatively warm product if flow to replace dispensed product, whereby the freeze barrel places on the refrigeration system a heat load that varies in accordance with the quantity and temperature of relatively warm replacement product periodically flowed into the freeze barrel, said method comprising the steps of:

heat exchange coupling an evaporator to the freeze barrel to chill product in the freeze barrel to within a selected temperature range;

metering refrigerant through an adjustable expansion valve to the evaporator;

delivering refrigerant to the expansion vale with a variable speed compressor;

sensing a chilling requirement placed on the refrigeration system by a flow of relatively warm product into the freeze barrel, that is to be provided by the refrigeration system in order for the refrigeration system to cool the product to within the selected temperature range;

selecting, in response to performance of said sensing step, the duration of a time interval during and throughout which the refrigeration system is to provide the sensed chilling requirement; and operating the refrigeration system, in response to performance of said sensing and selecting steps, to control the speed of operation of the compressor to deliver refrigerant to the expansion valve, and to adjust the expansion valve to meter refrigerant to the evaporator, at flow rates such that the refrigeration system provides the sensed chilling requirement during and throughout the selected time interval;

wherein the sensing step comprises detecting the quantity and temperature of relatively warm product flowed into the freeze barrel, determining the number of Btu's of chilling required to be provided by the refrigeration system to chill product flowed into the freeze barrel, and thereby product in the freeze barrel, to within the selected temperature range, said selecting step selecting the duration of a time interval during and throughout which the refrigeration system is to provide the determined number of Btu's, and including the step of ascertaining the mass flow of refrigerant required to be metered by the expansion valve to the evaporator to provide the determined number of Btu's, said operating step adjusting the speed of the compressor and the metering rate of the expansion valve to deliver to the evaporator the ascertained mass flow of refrigerant during the selected time interval.

* * * * *

UNITED STATES PATENT AND TRADEMARK OFFICE
CERTIFICATE OF CORRECTION

PATENT NO. : 8,408,017 B2
APPLICATION NO. : 13/065045
DATED : April 2, 2013
INVENTOR(S) : Daniel C. Leaver and Gregory M. Billman It is certified that error appears in the above-identified patent and that said Letters Patent is hereby corrected as shown below:

In the Specification

Column 5, line 3, "a matches" should read --matches a--.
Column 10, line 49, reference number "299" should read --222--.
Column 13, line 27, "which may measured" should read --which may be measured--.
Column 14, line 58, "responds" should read --respond--.
Column 17, line 52, "terms the" should read --terms of the--.
Column 21, line 5, "BUT T" should read --BTU T--.

In the Claims

Column 23, line 30, "load that" should read --load, that--.
Column 24, line 23, "the cont" should read --the count--; line 42, "vale" should read --valve--. Column 25, line 16, "vale" should read --valve--.
Column 26, line 19, "vale" should read --valve--.

Signed and Sealed this
Eleventh Day of March, 2014

Michelle K. Lee
*Deputy Director of the United States Patent and Trademark Office*